(12) United States Patent
Park et al.

(10) Patent No.: US 10,599,210 B2
(45) Date of Patent: Mar. 24, 2020

(54) PROCESSOR, COMPUTING DEVICE INCLUDING THE SAME AND METHOD OF SELECTING LOW POWER MODE OF THE SAME

(71) Applicant: Samsung Electronics Co., Ltd., Suwon-si, Gyeonggi-do (KR)

(72) Inventors: Jong-lae Park, Anyang-si (KR); Ju-hwan Kim, Hwaseong-si (KR); Bum-gyu Park, Suwon-si (KR); Dae-yeong Lee, Hwaseong-si (KR); Dong-hyeon Ham, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 141 days.

(21) Appl. No.: 15/867,024

(22) Filed: Jan. 10, 2018

(65) Prior Publication Data

US 2019/0004591 A1 Jan. 3, 2019

(30) Foreign Application Priority Data

Jun. 29, 2017 (KR) .......................... 10-2017-0082911

(51) Int. Cl.
*G06F 1/00* (2006.01)
*G06F 1/3287* (2019.01)
(Continued)

(52) U.S. Cl.
CPC ............ *G06F 1/3287* (2013.01); *G06F 1/324* (2013.01); *G06F 1/3225* (2013.01);
(Continued)

(58) Field of Classification Search
None
See application file for complete search history.

(56) References Cited

U.S. PATENT DOCUMENTS

| 5,745,778 A | 4/1998 | Alfieri |
| 5,752,045 A | 5/1998 | Chen |

(Continued)

FOREIGN PATENT DOCUMENTS

| JP | H06-267175 A | 9/1994 |
| JP | 3522140 B2 | 4/2004 |

(Continued)

*Primary Examiner* — Nitin C Patel
(74) *Attorney, Agent, or Firm* — Harness, Dickey & Pierce, P.L.C.

(57) ABSTRACT

An application processor including at least one core, at least one first cache respectively connected to the at least one core, the at least one first cache associated with an operation of the at least one core, a second cache associated with an operation of the at least one core, the second cache having a storage capacity greater than the first cache, a cache utilization management circuit configured to generate, a power control signal for power management of the application processor based on a cache hit rate of the second cache; and a power management circuit configured to determine, a power state level of the application processor based on the power control signal and an expected idle time, the power management circuit configured to control the at least one core, the at least one first cache, and the second cache based on the power state level may be provided.

20 Claims, 19 Drawing Sheets

(51) Int. Cl.
*G06F 1/3234* (2019.01)
*G06F 11/30* (2006.01)
*G06F 12/0811* (2016.01)
*G06F 1/324* (2019.01)
*G06F 1/3296* (2019.01)
*G06F 1/3225* (2019.01)
*G06F 12/0806* (2016.01)

(52) U.S. Cl.
CPC .......... *G06F 1/3275* (2013.01); *G06F 1/3296* (2013.01); *G06F 11/3037* (2013.01); *G06F 11/3062* (2013.01); *G06F 12/0806* (2013.01); *G06F 12/0811* (2013.01); *G06F 2201/88* (2013.01); *G06F 2201/885* (2013.01)

(56) References Cited

U.S. PATENT DOCUMENTS

| | | | |
|---|---|---|---|
| 5,761,715 A * | 6/1998 | Takahashi | G06F 1/3215 |
| | | | 711/128 |
| 5,787,486 A | 7/1998 | Chin et al. | |
| 5,828,860 A | 10/1998 | Miyaoku et al. | |
| 6,081,868 A | 6/2000 | Brooks | |
| 6,188,626 B1 | 2/2001 | Chang | |
| 6,249,883 B1 | 6/2001 | Cassidy et al. | |
| 7,536,511 B2 | 5/2009 | Thompson | |
| 7,694,075 B1 | 4/2010 | Feekes, Jr. | |
| 7,818,502 B2 | 10/2010 | Kurokawa | |
| 8,683,132 B1 | 3/2014 | Danilak | |
| 8,984,311 B2 | 3/2015 | Moses et al. | |
| 9,071,550 B2 | 6/2015 | Tang et al. | |
| 2004/0117678 A1 * | 6/2004 | Soltis, Jr. | G06F 1/206 |
| | | | 713/320 |
| 2004/0205300 A1 * | 10/2004 | Bearden | G06F 12/0862 |
| | | | 711/137 |
| 2006/0245275 A1 * | 11/2006 | Naito | G11C 7/20 |
| | | | 365/191 |
| 2007/0150655 A1 | 6/2007 | Nakasato | |
| 2011/0283124 A1 * | 11/2011 | Branover | G06F 1/3203 |
| | | | 713/323 |
| 2012/0173907 A1 * | 7/2012 | Moses | G06F 1/3225 |
| | | | 713/321 |
| 2014/0208142 A1 | 7/2014 | Tamura | |
| 2016/0342518 A1 | 11/2016 | Park et al. | |
| 2017/0083334 A1 * | 3/2017 | Burger | G06F 9/268 |
| 2017/0300418 A1 * | 10/2017 | Reed | G06F 12/0862 |
| 2018/0081382 A1 * | 3/2018 | Tsao | G05F 1/565 |

FOREIGN PATENT DOCUMENTS

| | | |
|---|---|---|
| JP | 4072665 B2 | 4/2008 |
| JP | 5167952 B2 | 3/2013 |
| JP | 5484281 B2 | 5/2014 |
| KR | 10-0301791 B1 | 6/2001 |

* cited by examiner

PROCESSOR, COMPUTING DEVICE INCLUDING THE SAME AND METHOD OF SELECTING LOW POWER MODE OF THE SAME

CROSS-REFERENCE TO RELATED APPLICATION

This application claims priority under 35 U.S.C. § 119 to Korean Patent Application No. 10-2017-0082911, filed on Jun. 29, 2017, in the Korean Intellectual Property Office, the disclosure of which is incorporated herein in its entirety by reference.

BACKGROUND

The inventive concepts relate to processors, and more particularly, to devices for and/or methods of controlling entry into a low power mode of the processors.

How to reduce an amount of power consumed in an operation of an electronic device is a widespread and common problem, and various methods for reducing the amount of power consumed have been proposed.

SUMMARY

The inventive concepts provide devices and methods of controlling entry into a low power mode, in consideration of performance degradation after exiting the low power mode, in a processor or a computing device including the processor.

According to an example embodiment, an application processor includes at least one core, at least one first cache respectively connected to the at least one core, the at least one first cache associated with an operation of the at least one core, a second cache associated with an operation of the at least one core, the second cache having a storage capacity greater than the at least one first cache, a cache utilization management circuit configured to generate, a power control signal for power management of the application processor based on a cache hit rate of the second cache, and a power management circuit configured to determine a power state level of the application processor based on the power control signal and an expected idle time, the power management circuit configured to control the at least one core, the at least one first cache, and the second cache based on the power state level.

According to an example embodiment, a method of entering a low power mode of an application processor includes receiving, by the application processor, an expected idle time from a source external to the application processor, comparing, by the application processor, the expected idle time with at least one target residency time to determine a temporary power state level, calculating, by the application processor, a cache hit rate of a first cache of the application processor, generating, by the application processor, a power control signal based on the cache hit rate, and determining, by the application processor, a power state level of the application processor based on the power control signal and the temporary power state level.

According to an example embodiment, a computing device includes at least one external cache memory, and at least one processor outside the at least one external cache memory, the at least one processor configured to generate, based on a cache hit rate of the at least one external cache memory, a power control signal for power management of the computing device, determine a power state level of the computing device based on the power control signal, and control the at least one processor and the at least one external cache memory based on the power state level.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Hereinafter, some example embodiments of the inventive concepts will be described in detail with reference to the accompanying drawings.

Figure 1:
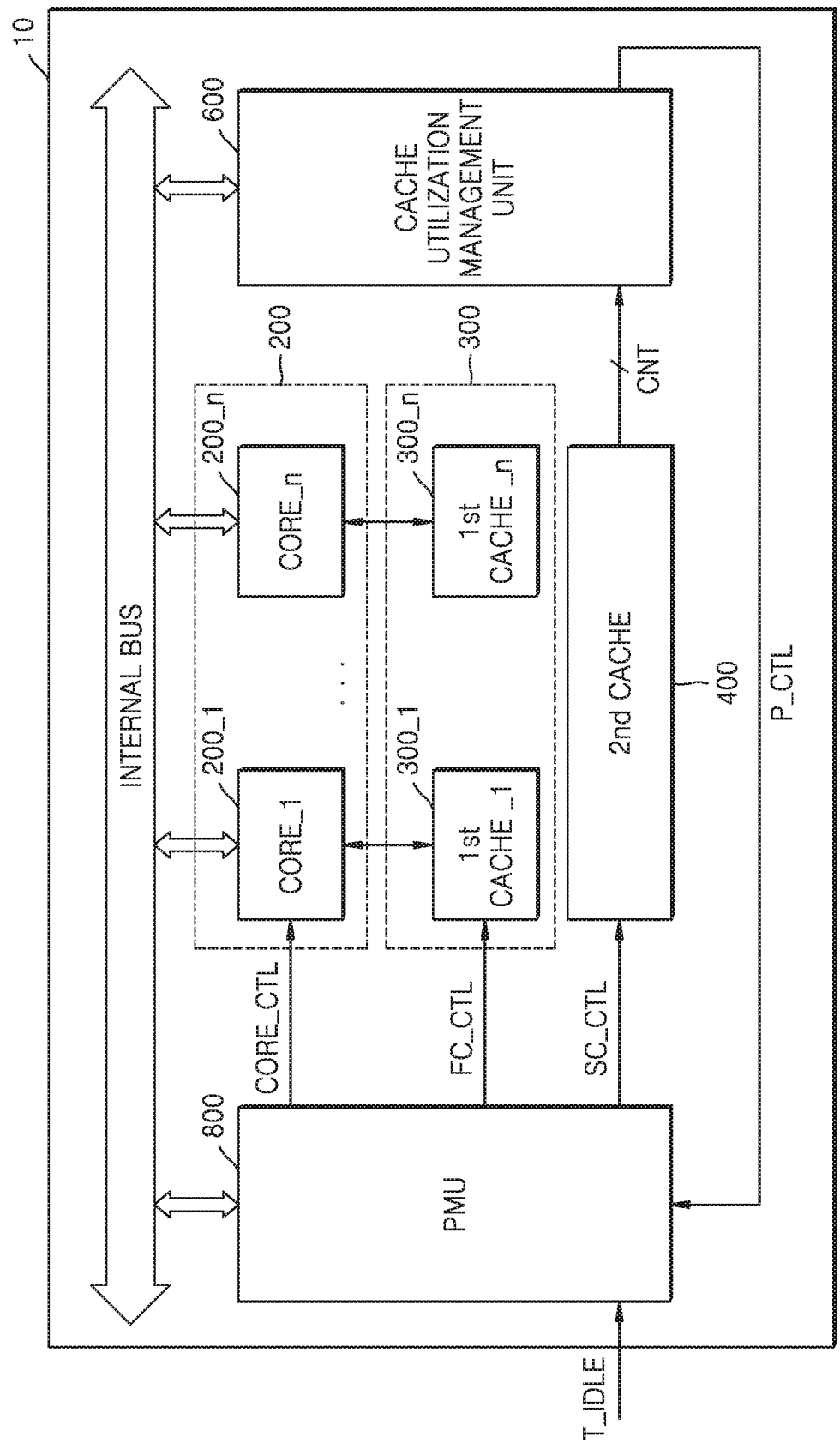
FIG. 1 shows an application processor according to an example embodiment of the inventive concepts.

FIG. 1 shows an application processor (AP) 10 according to an example embodiment of the inventive concepts. The AP 10 may be a semiconductor system which is configured to drive various application programs in a mobile communication terminal such as a smart phone, a tablet, a smart watch, and a personal digital assistant (PDA). The AP 10 may further include, even though not illustrated in FIG. 1, a graphics processing unit (GPU), a communication chip, and/or a sensor, which is implemented as a system on chip (SoC), a system in package (SiP), or the like, and configured to perform various functions.

Referring to FIG. 1, the AP 10 may include a core 200, a first cache 300, a second cache 400, a cache utilization management unit 600, and a power management unit (PMU) 800. The core 200, the first cache 300, the second cache 400, the cache utilization management unit 600, and the PMU 800 may be connected to an internal bus to exchange various data.

The core 200 may be an embedded processing circuit that is configured to execute program commands inside the AP 10. The AP 10 may include one core and in this case, the AP 10 may be referred to as a single core processor. The AP 10 may include a plurality of cores 200_1 through 200_n (n is a natural number of 2 or more), and in this case, the AP 10 may be referred to as a multi-core processor.

The first cache 300 may be a cache memory inside the AP 10, and may be a memory that stores commands and data for processing operations frequently repeated in the core 200. The first cache 300 may shorten processing time of the core 200. The first cache 300 may include one cache memory or n cache memories (n is a natural number of 2 or more). At least one of first caches 300_1 through 300_n (n is a natural number of 1 or more) may be connected to the cores 200_1 through 200_n and may be associated with operations of cores 200_1 through 200_n, respectively. At least one of the first caches 300_1 through 300_n may include a level 1 cache (an L1 cache).

The second cache 400 may be a cache memory that is configured to store data for the cores 200_1 through 200n in advance while the core 200 processes data, and may solve a problem of speed difference with respect to other devices (for example, a random access memory (RAM)). A memory capacity of the second cache 400 may be greater than that of the first caches 300_1 through 300_n and may include at least one of a level 2 cache (an L2 cache) or a level 3 cache (an L3 cache). The first cache 300 and the second cache 400 may include volatile memories, and the volatile memory may include at least one of various memories such as a dynamic RAM (DRAM), a static RAM (SRAM), a synchronous dynamic RAM (SDRAM), a phase change RAM (PRAM), a magnetic RAM (MRAM), a resistive RAM (RRAM), or a ferroelectric RAM (FeRAM).

The cache utilization management unit 600 may calculate a cache hit rate of the second cache 400 by counting a hit count and a miss count of the cache memory of the second cache 400, and may generate a power control signal P_CTL for power management of the AP 10 based on the cache hit rate. The power control signal P_CTL may be transmitted via an internal bus or a separate line. The cache utilization management unit 600 may be implemented by software, hardware, or a combination thereof, and may be implemented by hardware or software driven by firmware or the like. As is known, the cache utilization management unit 600 may be implemented as an electronic circuit (e.g., cache utilization management circuit), which is configured to calculate a cache hit rate of the second cache 400, and generate the power control signal P_CTL for managing power of the AP 10 based on the cache hit rate. Needs for managing power of the AP 10 based on the cache hit rate of the second cache 400 will be described later with reference to FIG. 2.

The PMU 800 may manage power of the AP 10, and thus, may determine a power state level of the AP 10. The PMU 800 may control the core 200, the first cache 300, and the second cache 400 based on the determined power state level via a core control signal CORE_CTL, a first cache control signal FC_CTL and a second cache control signal SC_CTL, respectively. The PMU 800 may receive an expected idle time T_IDLE from outside of the AP 10 to determine the power state level, and may receive a power control signal P_CTL from the cache utilization management unit 600. The core control signal CORE_CTL, the first cache control signal FC_CTL, and the second cache control signal SC_CTL may be transmitted via the internal bus or separate lines. The expected idle time T_IDLE may denote a time that the AP 10 stays in an idle state and may be provided by an external operating system (OS) and a scheduler. The idle state also may be referred to as a low power mode. As is known, the PMU 800 may be implemented as an electronic circuit (e.g., power management circuit), which is configured to manage power and/or determine a power state level of the AP 10.

Figure 2:
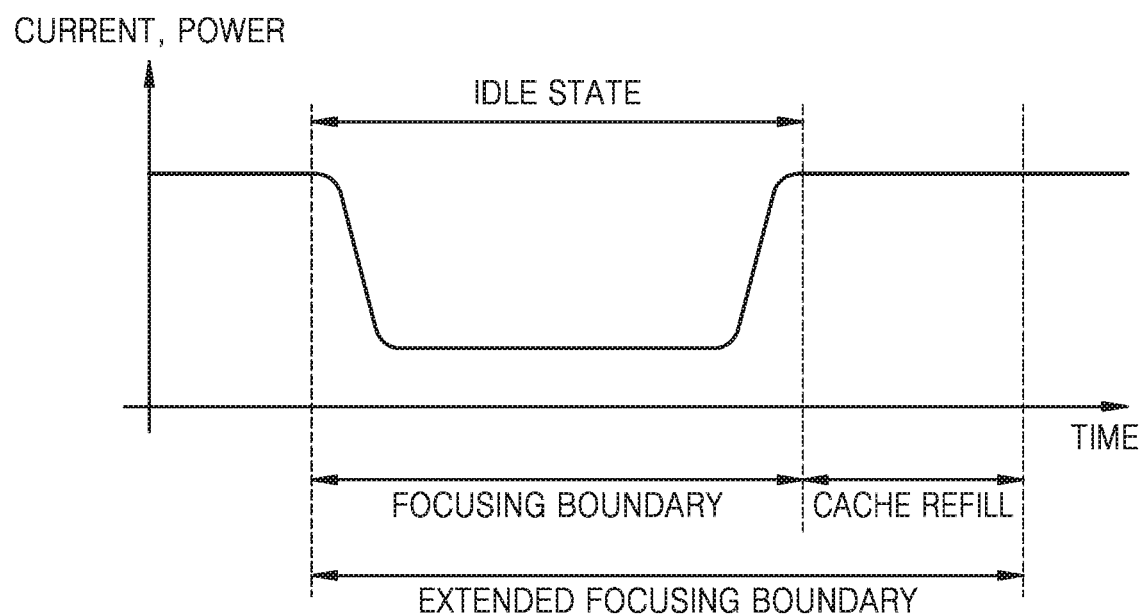
FIG. 2 shows a graph of current and/or power versus time in an application processor when entering and exiting a low power mode, according to an example embodiment of the inventive concepts.

FIG. 2 shows a graph of current and/or power over time in the AP 10 at entering and exiting the low power mode according to an example embodiment of the inventive concepts. The idle state may denote a state in which some or all of the components are turned off during a time when no load is applied to the AP 10 to reduce power consumption of the AP 10, or a state in which an operating speed of the AP 10 is slowed down under a threshold speed. A time domain considered for an idle state entry control of the AP 10 may be a focusing boundary in which the AP 10 stays in the idle state. Because the cache memory can include the volatile memory and data in such cache memory may be flushed when the cache memory is turned off at the idle state, the cache memory may be desired to be refilled in order for the operation of the AP 10 to be normalized after the AP 10 exits the idle state. At this time, when an amount of the cache memory to be refilled is large, performance of the AP 10 may deteriorate after exiting the idle state. Thus, a time range considered for the idle state entry control of the AP 10 may be an extended focusing boundary which is an extended time range, which includes a focusing boundary and a cache refill (or a period for the cache refill) period following the focusing boundary region. In order to manage the power of the AP 10 in consideration of an area of the cache refill, the PMU 800 may consider the hit rate of the cache before entering the idle state of the AP 10.

Figure 3A:
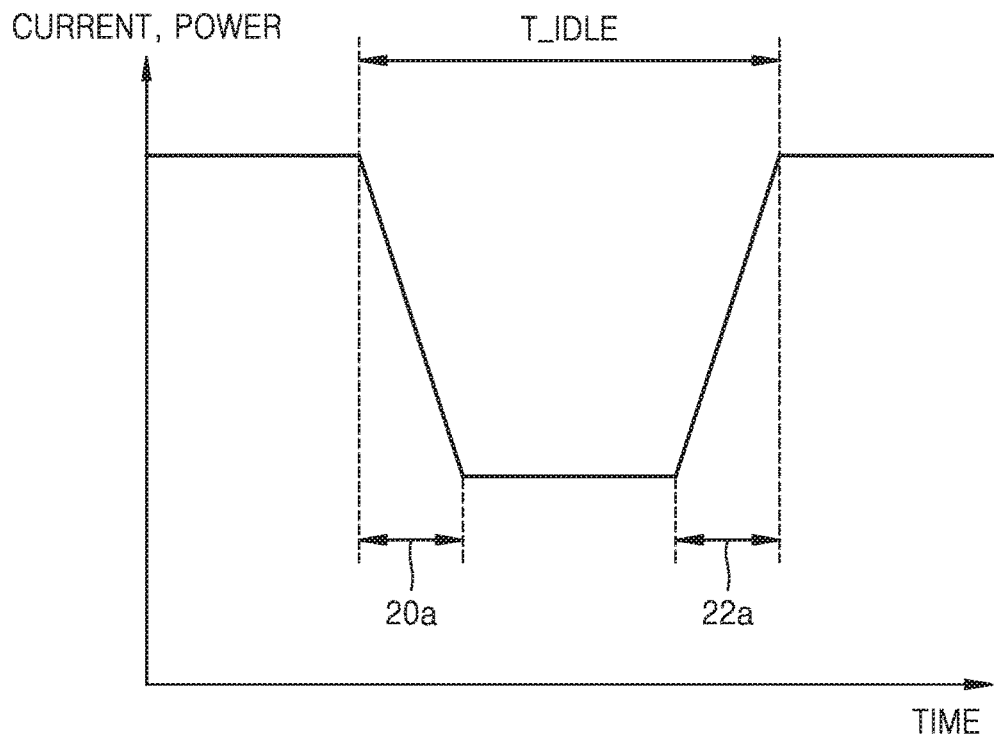
FIGS. 3A and 3B respectively show graphs of current and/or power versus time when entering and exiting a low power mode, according to example embodiments of the inventive concept.
Figure 3B:
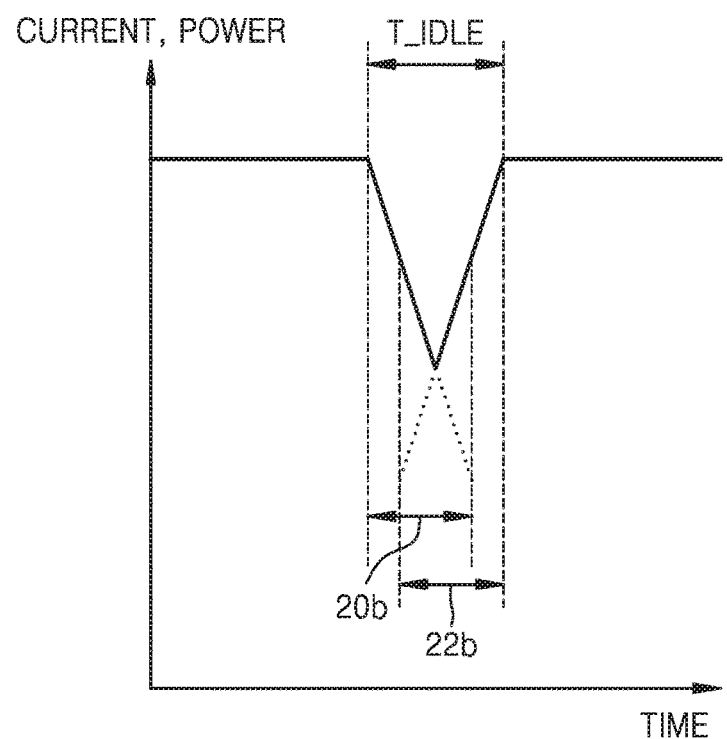

FIGS. 3A and 3B show graphs of current and/or power over time at entering and exiting the low power mode according to some example embodiments of the inventive concepts. For convenience of explanation, before determining a final power state level in consideration of the power control signal P_CTL received from the cache utilization management unit 600, the power state level determined based only on the expected idle time T_IDLE may be referred to as a temporary power state level. A method of determining the temporary power state level based on the expected idle time T_IDLE will be described with reference to FIGS. 3A and 3B. In order to determine the temporary power state level, the PMU 800 may compare the expected idle time T_IDLE with a target residency time (not shown). The target residency time may denote a reference time that is determined by taking into consideration a time desired for entering and exiting, and an amount of power consumed for the AP 10 entering and exiting the idle state. The target residency time may have different value depending on a level of the idle state (hereinafter, alternative referred to as "idle level").

Referring to FIG. 3A, the target residency time may be determined in consideration of an idle state entry time 20a, and an idle state exit time 22a, and the power consumed for the entering and exiting. The expected idle time T_IDLE may have a value greater than the target residency time of the idle level. In such a case, the AP 10 may enter the idle state corresponding to the idle level.

Referring to FIG. 3B, the target residency time may be determined in consideration of an idle state entry time 20b and an idle exit time 22b, and the power consumed for the entering and exiting. The expected idle time T_IDLE may have a value less than the idle target residency time of the idle level. In such a case the AP 10 may not enter the idle state corresponding to the idle level.

The PMU 800 may compare the expected idle time T_IDLE with the target residency time of the idle level when the temporary power state level of the AP 10 is determined to be equal to or higher than a certain (or threshold) idle level. When the expected idle time T_IDLE is greater than the target residency time of the idle level, the PMU 800 may increase the temporary power state level to a corresponding idle level, and when the expected idle time T_IDLE is less than the target residency time of the idle level, the PMU 800 may not raise the temporary power state level to the corresponding idle level.

Figure 4:
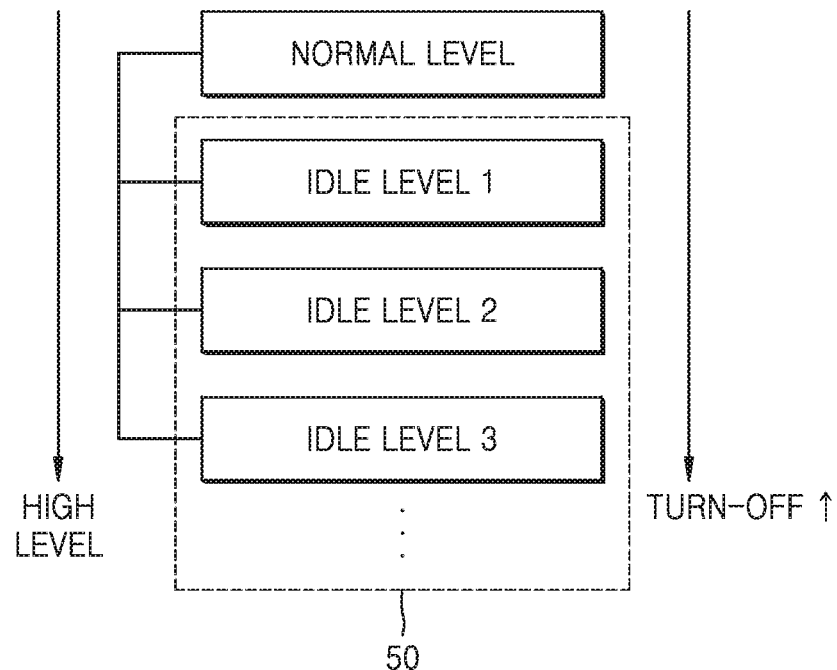
FIG. 4 shows a step-by-step representation of a power state level of an application processor, according to an example embodiment of the inventive concepts.

FIG. 4 shows a step-by-step representation of the power state level of the AP 10 according to an example embodiment of the inventive concepts.

The power state level may include a normal level indicating a state in which the AP 10 has not entered the low power mode (e.g., the idle state) and an idle level 50 indicating the idle state. The idle state may refer to a state of the AP 10 in which some or all of the AP components are turned off or the operating speed of the AP 10 is lowered below a threshold speed to reduce power consumption of the AP 10, and may be referred to as the low power mode. The idle level 50 may include a plurality of idle levels, and the plurality of idle levels may be classified according to the degree of the idle state. For convenience of explanation, as shown in FIG. 4, it may be described that the idle state is deeper (IDLE LEVEL 1 to IDLE LEVEL 2, and to IDLE LEVEL 3) as more components are turned off and the operation speed is lowered, and that the idle level is higher as the idle state is deeper. Conversely, it may be described that the idle state is shallower as less components are turned off and as the operation speed is faster, and that the idle level is lower as the idle state is shallower.

The idle level 50 may include a first idle level, a second idle level, and a third idle level in an decreasing order of the idle level. The idle state of the AP 10 corresponding to each of the first idle level, the second idle level, and the third idle level can be described below with reference to FIG. 5.

Figure 5:
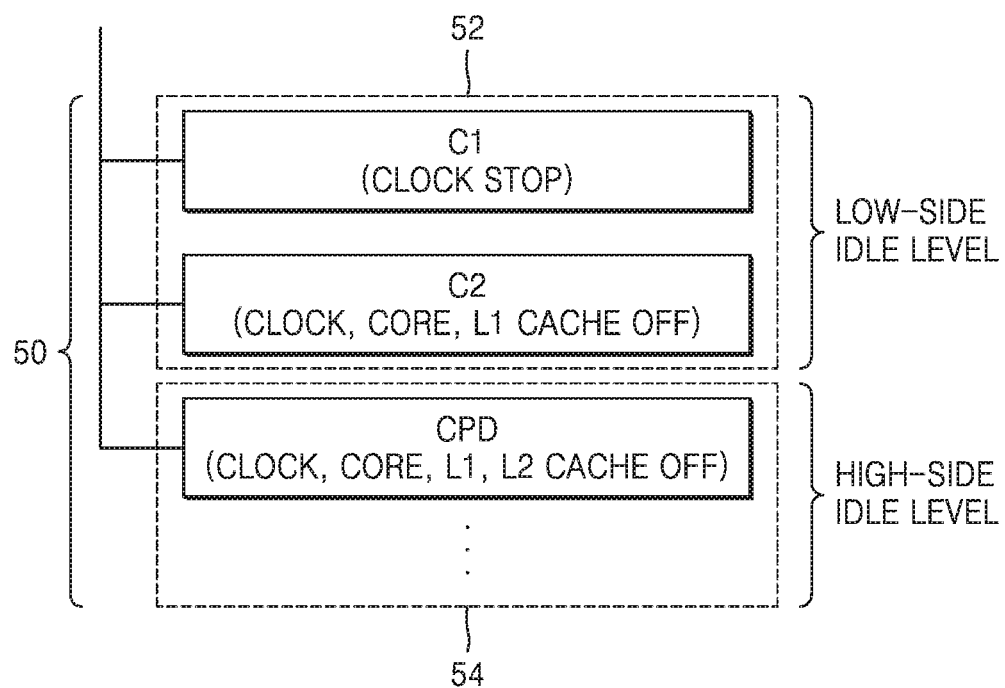
FIG. 5 shows a step-by-step representation of a plurality of idle levels, according to an example embodiment of the inventive concepts.

FIG. 5 shows a step-by-step representation of a plurality of idle levels 50 according to an example embodiment of the inventive concepts. The plurality of idle levels 50 may include a low-side idle level 52 in which the second cache is not turned off and a high-side idle level 54 in which the second cache is turned off.

The idle state for power management of the AP 10 may include a C-state. The power state level in the C-state may include a C1 level, a C2 level, and a cluster power down (CPD) level, depending on the degree of the idle state. The CPD level may also be referred to as a C3 level.

Referring to FIGS. 4 and 5, the first idle level may be the C1 level. The C1 level may be the shallowest (or lowest) level among the idle levels, at which the AP 10 may stop a clock thereof. The second idle level may be the C2 level, at which the AP 10 may stop the clock, turn off the core, and turn off the first cache. The third idle level may be the CPD level, at which the AP 10 may stop the clock, turn off the core, turn off the first cache, and turn off the second cache.

Because the C1 and C2 levels are idle states at which the L2 cache corresponding to the second cache is not turned off, the C1 and C2 levels may be classified as the low-side idle level 52, and because the CPD level is the idle state at which the L2 cache corresponding to the second cache is turned off, the CPD level may be classified as the high-side idle level 54.

Figure 6:
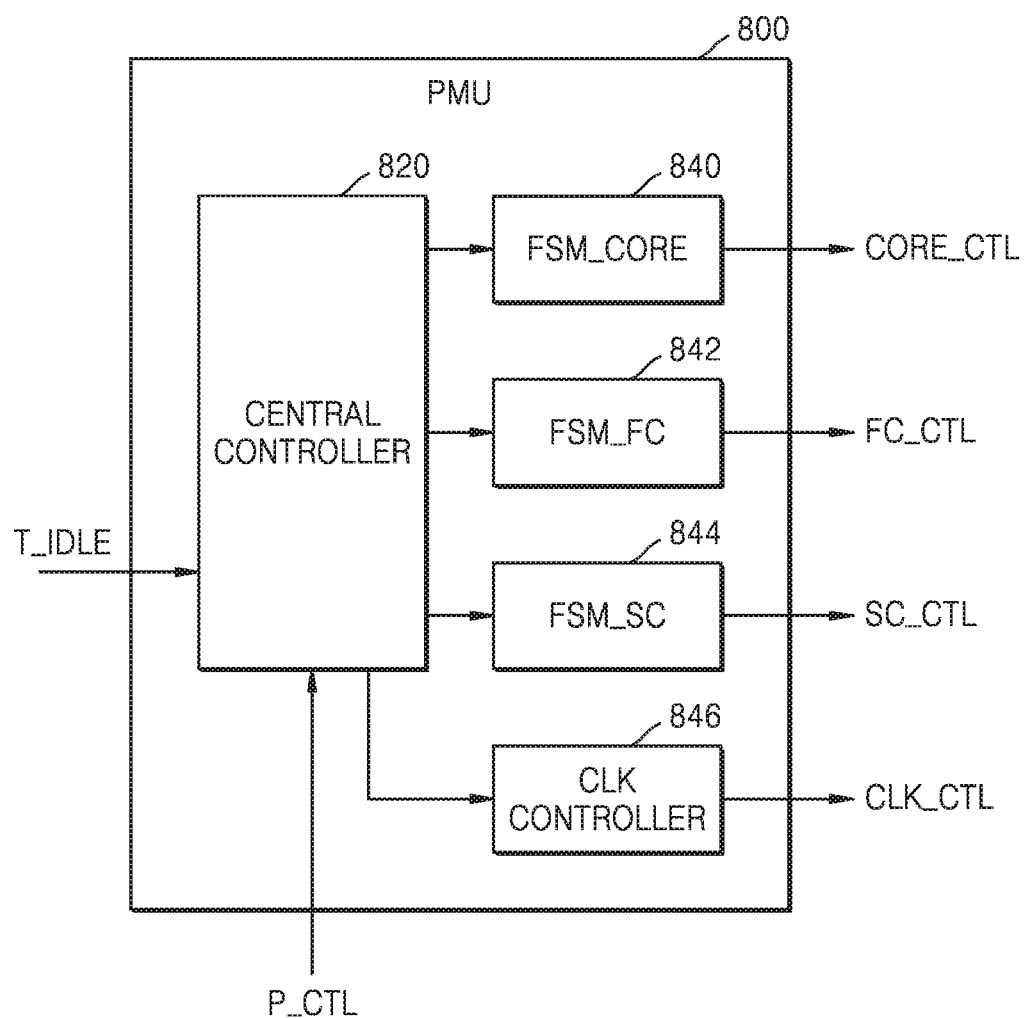
FIG. 6 shows an example block diagram of a power management unit according to an example embodiment of the inventive concepts.

FIG. 6 shows an example block diagram of the PMU 800 according to an example embodiment of the inventive concepts. The PMU 800 may include a central controller 820, a core finite state machine (FSM) 840, a first cache FSM 842, a second cache FSM 844, and a clock controller 846.

The central controller 820 of the PMU 800 may determine the power state level based on the expected idle time T_IDLE and the power control signal P_CTL by the same method as described with reference to FIGS. 3A through 5 and by the method described with reference to FIG. 13, and may control the core FSM 840, the first cache FSM 842, the second cache FSM 844, and the clock controller 846 based on the power state level.

The core FSM 840, the first cache FSM 842 and the second cache FSM 844 may control the core, the first cache, and the second cache according to the power state level determined by the central controller 820 via the core control signal CORE_CTL, the first cache control signal FC_CTL, and the second cache control signal SC_CTL, respectively. The core FSM 840 may control to turn off the core according to the control of the central controller 820. The first cache FSM 842 may control to turn off the first cache according to the control of the central controller 820. The second cache FSM 844 may control to turn off the second cache according to the control of the central controller 820. The manner in which the core and the second cache are controlled may be described below with reference to FIGS. 7A and 7B.

The clock controller 846 may control a clock speed of the AP 10 via the clock control signal CLK_CTL according to the power state level determined by the central controller 820. The clock controller 846 may transmit the clock control signal CLK_CTL to the clock management unit (CMU) of the AP 10 shown in FIG. 14 according to the control of the central controller 820.

Figure 7A:
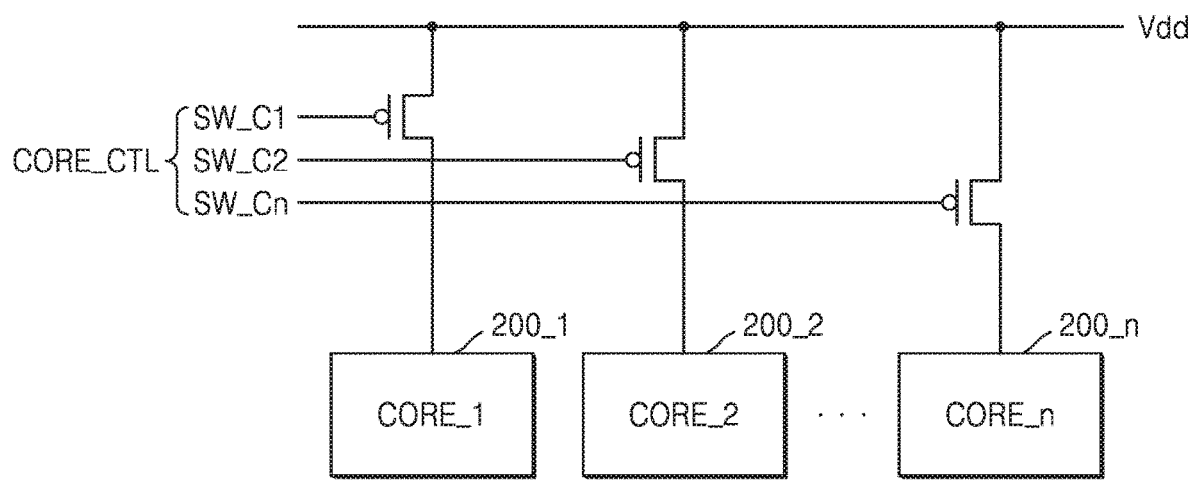
FIGS. 7A and 7B show block diagrams for illustrating operations in which a core and a second cache are controlled, according to some example embodiments of the inventive concepts.
Figure 7B:
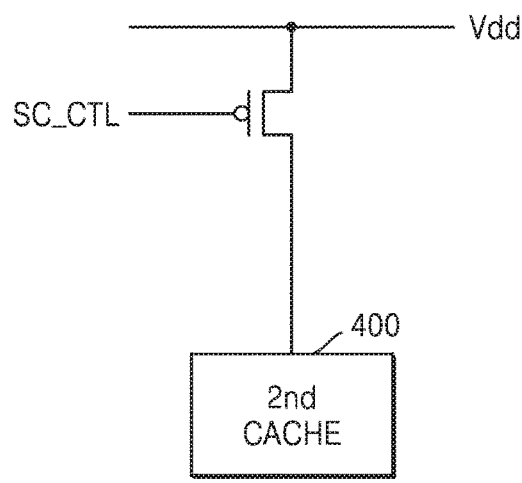

FIGS. 7A and 7B respectively show block diagrams for illustrating operations in which the core 200 and the second cache 400 are controlled according to some example embodiments of the inventive concepts.

Referring to FIG. 7A, at least one of the cores 200_1 through 200*n* may operate in conjunction with Vdd, and a switch may be present between each of the cores 200_1 through 200_*n* and the Vdd. When a signal to turn on the switch is received at the switch, the core connected to the switch may be connected to the Vdd and turned on. When a signal to turn off the switch is received at the switch, the core connected to the switch may be disconnected from the Vdd and turned off. Each switch may include a transistor.

The core control signal CORE_CTL may include core switch control signals SW_C1 through SW_Cn for controlling n cores 200_1 through 200_*n*, respectively. Although not shown in the figure, the first cache control signal FC_CTL for controlling the first cache connected to each core may be the same as the core control signal CORE_CTL for controlling the core. Hereinafter, for convenience of explanation, it is assumed that when '1' is inputted to the core switch control signals SW_C1 through SW_Cn, the switches are turned on and when '0' is inputted to the core switch control signals SW_C1 through SW_Cn, the switches are turned off. However, example embodiments are not limited thereto.

Referring to FIGS. 5 and 7A, the core switch control signals SW_C1, SW_C2, . . . , SW_Cn may be 1, 1, . . . , 1 in the idle state at the C1 level corresponding to the shallowest idle state among the idle states, and accordingly, each core may be in a turn-on state. The core switch control signals SW_C1, SW_C2, . . . , SW_Cn may be 0, 0, . . . , 0 in the idle state at the C2 level corresponding to an idle state one step deeper than the C1 level and the CPD level corresponding to an idle state one step further deeper than the C2 level, and thus each core may be in a turn-off state.

Referring to FIG. 7B, the second cache 400 may operate in conjunction with the Vdd, and a switch may be present between the second cache 400 and the Vdd. When a signal to turn on the switch is received at the switch, the second cache 400 connected to the switch may be connected to the Vdd and turned on. When a signal to turn off the switch is received at the switch, the core connected to the corresponding switch may be disconnected from the Vdd and turned off. Each switch may include a transistor.

The second cache control signal SC_CTL may be a switch control signal for controlling the second cache 400. Referring to FIGS. 5 and 7B, in the idle state at the C1 level corresponding to the shallowest idle state among the idle states and the idle state at the C2 level corresponding to an idle state one step further deeper than the C1 level, the second cache control signal SC_CTL may be '1', and accordingly, the second cache may be in a turn-on state. In an idle state that is one step deeper than the C2 level, the second cache control signal SC_CTL may be a '0', and accordingly, the second cache may be in a turn-off state. As such, the AP 10 may reduce power consumption by turning off the components as desired.

Figure 8:
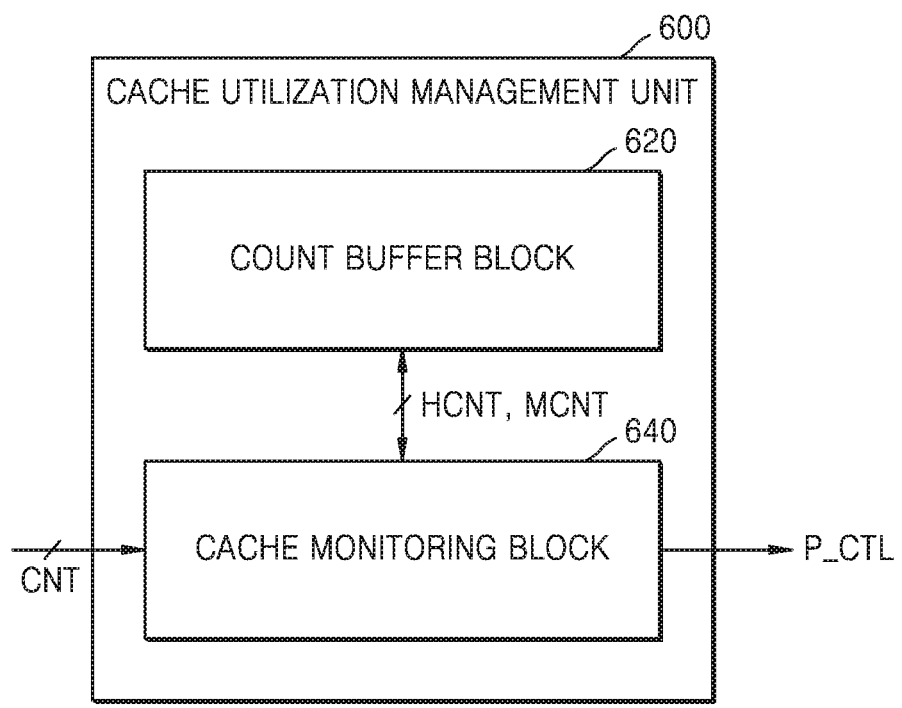
FIG. 8 shows an example block diagram of a cache utilization management unit, according to an example embodiment of the inventive concepts.

FIG. 8 shows an example block diagram of the cache utilization management unit 600 according to an example embodiment of the inventive concepts. The cache utilization management unit 600 may include a count buffer block (also referred to as "count buffer") 620 and a cache monitoring block (also referred to as "cache monitor") 640.

The cache monitoring block 640 may receive a count information CNT from the second cache and generate a power control signal P_CTL based on the count information CNT. The count information CNT may include the hit count HCNT and the miss count MCNT of the second cache for a desired (or alternatively, predetermined) monitoring period. The cache monitoring block 640 may count the hit count HCNT and the miss count MCNT of the second cache 400 for a monitoring period, and store results in the count buffer block 620. In addition, the cache monitoring block 640 may receive the hit count HCNT and the miss count MCNT stored in the count buffer block 620 in each monitoring period, and calculate a cache hit rate based on the hit count HCNT and the miss count MCNT. The cache monitoring block 640 may generate the power control signal P_CTL for power management of the AP 10 based on the cache hit rate.

The count buffer block 620 may receive and store the hit count HCNT and the miss count MCNT in each monitoring period from the cache monitoring block 640. In addition, the count buffer block 620 may transmit to the cache monitoring block 640 the hit count HCNT and the miss count MCNT of each monitoring period stored therein.

Figure 9:
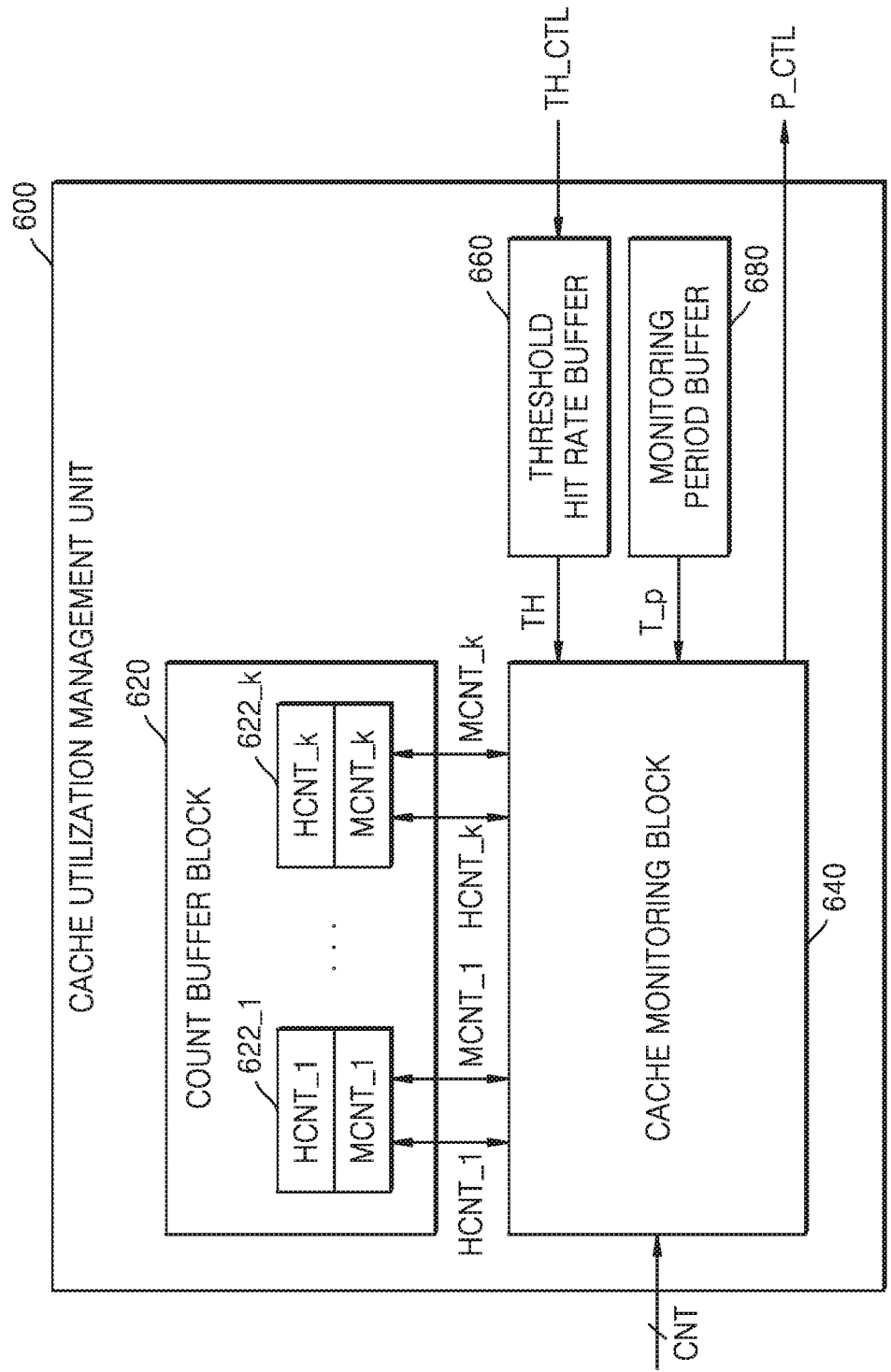
FIG. 9 shows an example block diagram of a cache utilization management unit, according to an example embodiment of the inventive concepts.

FIG. 9 shows an example block diagram of the cache utilization management unit 600 according to an example embodiment of the inventive concepts. The cache utilization management unit 600 may include the count buffer block 620, the cache monitoring block 640, a threshold hit rate buffer 660, and a monitoring period buffer 680.

The count buffer block 620 may include at least one of count buffers 622_1 through 622_*k* (k is a natural number of 1 or more). The count buffer block 620 may divide the hit count HCNT received from the cache monitoring block 640 into a first hit count HCNT_1, a second hit count HCNT_2, . . . , and the $k^{th}$ hit count HCNT_k and store results, and divide the miss counts MCNT into a first miss count MCNT_1, a second miss count MCNT_2, . . . , and a $k^{th}$ miss count MCNT_k and store results. As an example, the HCNT_1 and the MCNT_1 may be stored in the first count buffer 622_1, the HCNT_2 and the MCNT_2 may be stored in the second count buffer 622_2, and the HCNT_k and the MCNT_k may be stored in the $k^{th}$ count buffer 622_*k*. However, methods in which the count buffer block 620 can manage a plurality of HCNTs and MCNTs may not be limited thereto.

The cache monitoring block 640 may calculate the cache hit rate based on the hit count HCNT and the miss count MCNT of the second cache 400, as described above with reference to FIG. 8, and may generate the power control signal P_CTL for power management of the AP 10 based on the calculated cache hit rate. The cache monitoring block 640 may compare the calculated cache hit rate with a threshold hit rate TH to generate the power control signal P_CTL. The threshold hit rate TH may be provided by the threshold hit rate buffer 660.

When the cache hit rate is greater than the threshold hit rate TH, degradation of the AP 10 due to the cache refill may occur when the AP 10 enters the idle state and then exits the idle state again. In such cases, the cache monitoring block 640 may generate a power control signal P_CTL such that the AP 10 does not enter a deep idle state. Referring to FIG. 5, the cache monitoring block 640 may generate a power control signal P_CTL such that AP 10 does not enter the high-side idle level 54.

On the other hand, when the cache hit rate is less than the threshold hit rate TH, degradation of the AP 10 due to the cache refill may not occur when the AP 10 enters the idle state and exits the idle state again. In such cases, the cache monitoring block 640 may generate the power control signal P_CTL such that the AP 10 can enter the deep idle state. Referring to FIG. 5, the cache monitoring block 640 may generate the power control signal P_CTL such that the AP 10 enters the high-side idle level 54.

The threshold hit rate buffer 660 may store the threshold hit rate TH and provide to the cache monitoring block 640. The threshold hit rate TH may be a value that is set when the AP 10 is manufactured or may be a variable value that varies depending on a user's setting when the AP 10 is used in a product (e.g., a mobile communication terminal). In some example embodiments, the threshold hit rate buffer 660 may set the value of the threshold hit rate TH based on a threshold control signal TH_CTL provided from the outside of the AP 10.

A user may set the threshold hit rate TH to a small value when the performance of the mobile communication terminal is more important than the power management. In a situation where the power management is more important than the performance degradation of the mobile communication terminal, the threshold hit rate TH may be set to a large value.

The monitoring period buffer 680 may store the monitoring period T_p and provide to the cache monitoring block 640. The monitoring period T_p may be a period in which the cache monitoring block 640 receives the count information CNT of the second cache and stores the hit count HCNT and the miss count MCNT in the count buffer block 620, and may be a timer resolution value that is a unit time in which an OS of the mobile communication terminal operates.

Figure 10:
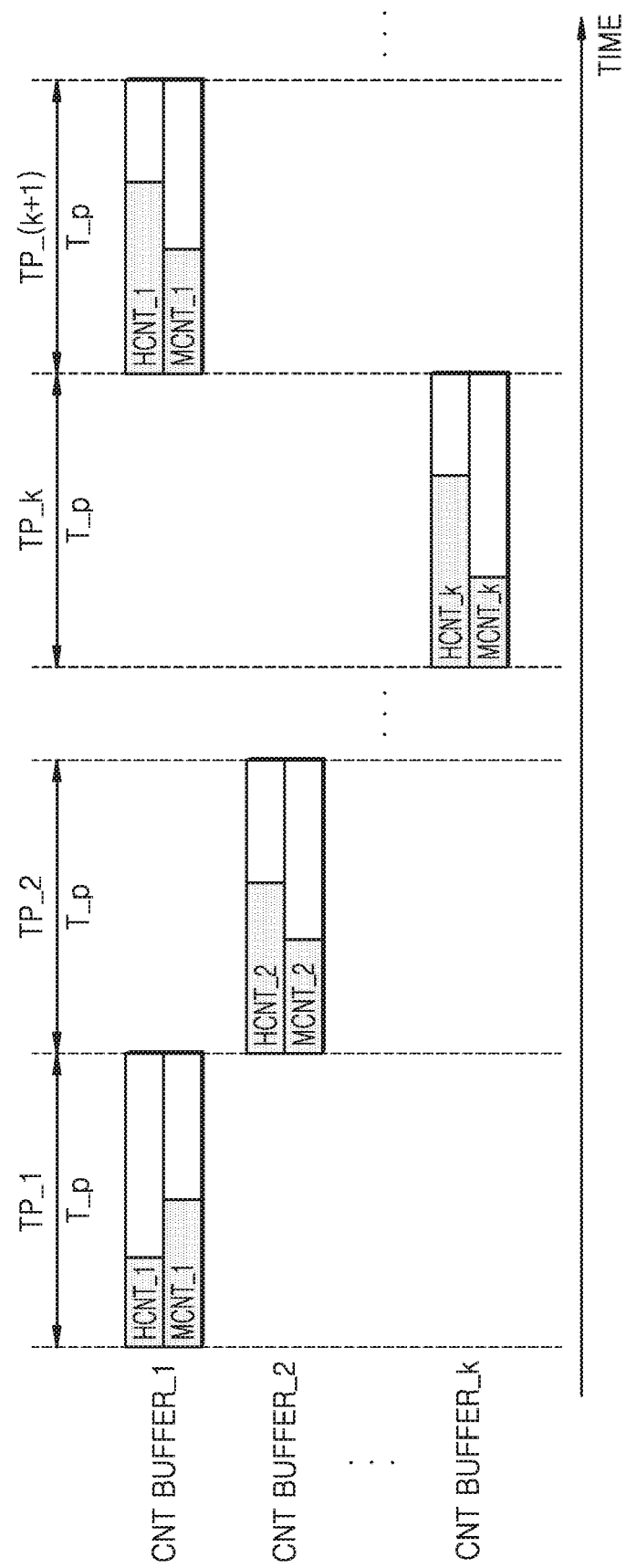
FIG. 10 is a time flow diagram illustrating a method in which a plurality of count buffers store hit counts and miss counts, according to an example embodiment of the inventive concepts.

FIG. 10 is a time flow diagram illustrating a method in which a plurality of count buffers CNT BUFFER_1 through CNT BUFFER_k store the hit counts HCNTs and the miss counts MCNTs according to an example embodiment of the inventive concepts. The manner of storing the hit count HCNT and the miss count MCNT shown in FIG. 10 may be described with reference to FIG. 9.

The cache monitoring block 640 may monitor the second cache for a first monitoring period TP_1, count the hit count HCNT and the miss count MCNT during the monitoring period T_p, and store results in the count buffer block 620. The count buffer block 620 may store in the first count buffer CNT BUFFER_1 the hit count HCNT and the miss count MCNT received from the cache monitoring block 640 as the first hit count HCNT_1 and the first miss count MCNT_1, respectively.

The cache monitoring block 640 may store in the count buffer block 620 the hit count HCNT and the miss count MCNT counted during a second monitoring period TP_2, and the count buffer block 620 may store in the second count buffer CNT BUFFER_2 the hit count HCNT and the miss count MCNT received from the cache monitoring block 640 as the second hit count HCNT_2 and the second miss count MCNT_2, respectively.

In a recursive manner, the cache monitoring block 640 may store in the count buffer block 620 the hit count HCNT and the miss count MCNT counted during a $k^{th}$ monitoring period TP_k, and the count buffer block 620 may store in the $k^{th}$ count buffer CNT BUFFER_k the hit count HCNT and the miss count MCNT received from the cache monitoring block 640 as the $k^{th}$ hit count HCNT_k and the $k^{th}$ miss count MCNT_k, respectively.

After a $(k+1)^{th}$ monitoring period TP_(k+1) has passed, the count buffer block 620 may delete information on the first hit count HCNT_1 and the first miss count MCNT_1 stored in the existing first count buffer CNT BUFFER_1, and then, store in the first count buffer CNT BUFFER_1 the hit count HCNT and the miss count MCNT counted during a $k+1^{th}$ monitoring period TP_k+1, and received from the cache monitoring block 640 as the first hit count HCNT_1 and the first miss count MCNT_1, respectively.

The hit counts HCNTs and the miss counts MCNTs may be stored in the count buffer block 620 through a repetition of the above-described method for the time thereafter.

As shown in FIG. 10, the count buffer block may identify a trend of the cache hit rate with high reliability by including a plurality of count buffers CNT BUFFER_1 through CNT BUFFER_k, and managing the hit count HCNT and the miss count MCNT as a plurality of values HCNT_1 through HCNT_k and MCNT_1 through MCNT_k. In other words, even when the cache hit rate temporarily indicates an outlier that does not match an average trend over time, the cache utilization management unit 600 may operate without being influenced by the outlier.

Figure 11A:
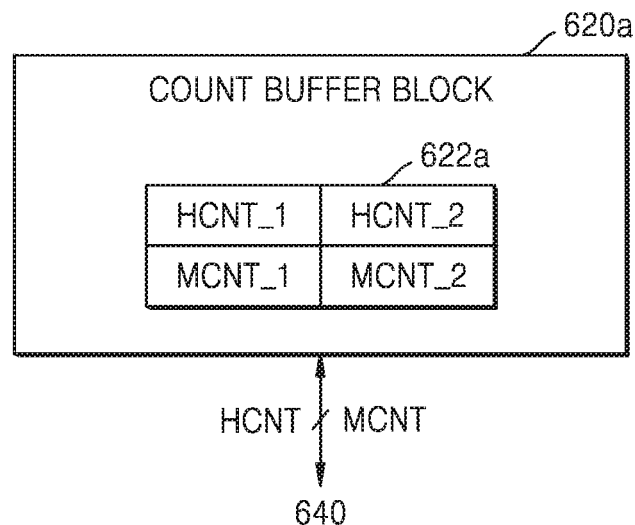
FIGS. 11A and 11B show example block diagrams of count buffer blocks, according to some example embodiments of the inventive concept.
Figure 11B:
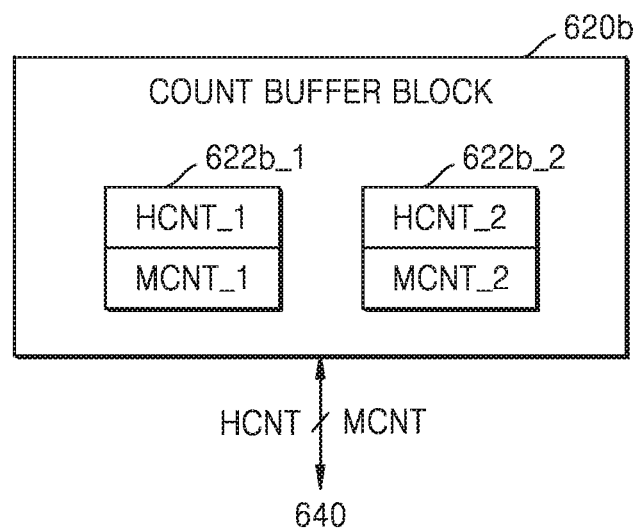

FIGS. 11A and 11B show example block diagrams of count buffer blocks 620a and 620b according to some example embodiments of the inventive concepts. The count buffer blocks 620a and 620b may divide the hit count HCNT received from the cache monitoring block 640 into the first hit count HCNT_1 and the second hit count HCNT_2 in an alternating manner with respect to each monitoring period T_p and store results, and divide the miss count MCNT into the first miss count MCNT_1 and the second miss count MCNT_2 in an alternating manner with respect to each monitoring period T_p and store results. In addition, the count buffer block 620a may include one count buffer 622a as shown in FIG. 11A, and the count buffer block 620b may include two count buffers 622b_1 and 622b_2 as shown in FIG. 11B.

Referring to FIG. 11A, the count buffer block 620a may include one count buffer 622a. One count buffer 622a may divide a storage area thereof, divide the hit count HCNT received from the cache monitoring block 640 into the first hit count HCNT_1 and the second hit count HCNT_2 and store results, and may divide the miss count MCNT into the first miss count MCNT_1 and the second miss count MCNT_2 and store results.

Referring to FIG. 11B, the count buffer block 620b may include two count buffers 622b_1 and 622b_2 for convenience of data management. The first count buffer 622b_1 may store the first hit count HCNT_1 and the first miss count MCNT_1, and the second count buffer 622b_2 may store the second hit count HCNT_2 and the second miss count MCNT_2.

Figure 12:
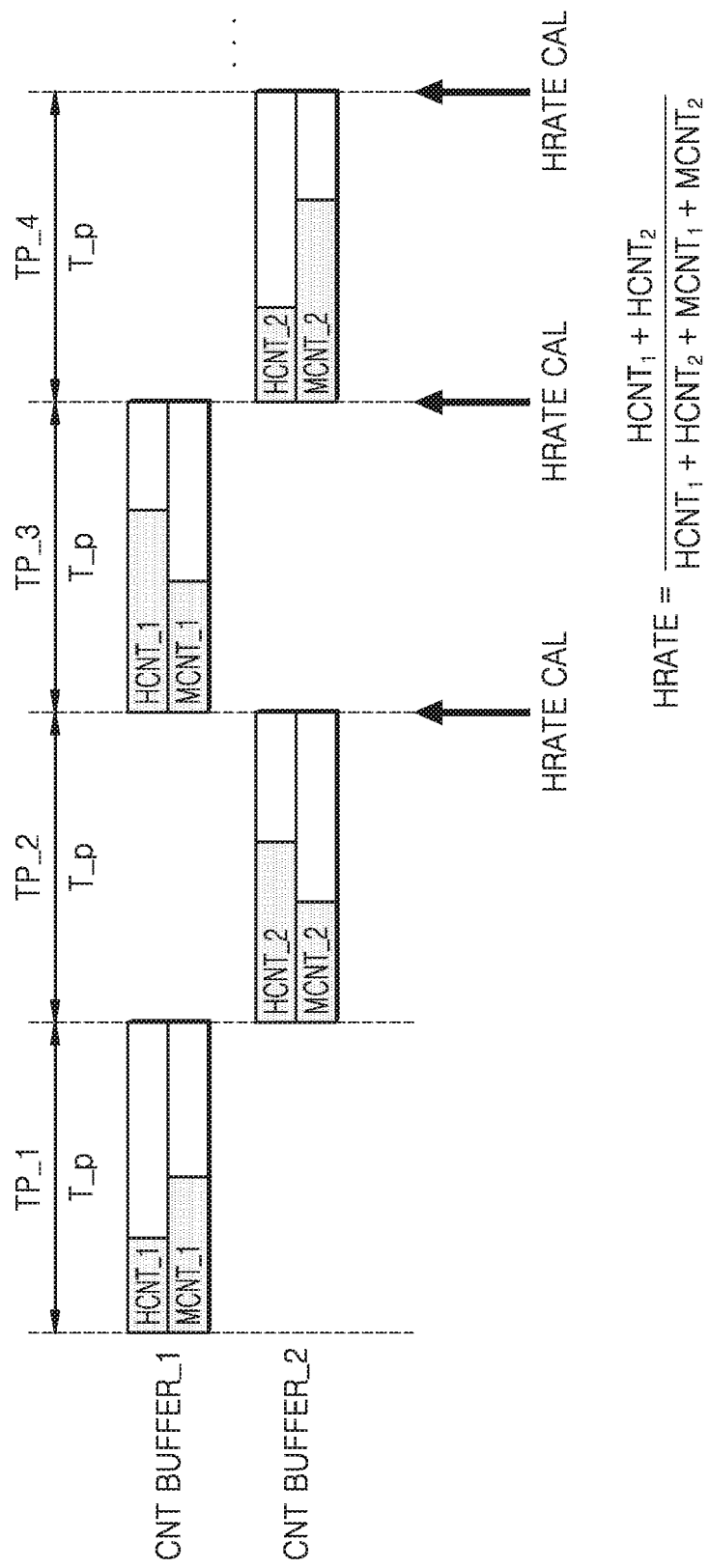
FIG. 12 is a time flow diagram illustrating a method in which two count buffers store hit counts and miss counts, according to an example embodiment of the inventive concepts.

FIG. 12 is a time flow diagram illustrating a method in which two count buffers CNT BUFFER_1 and CNT BUFFER_2 store the hit counts HCNTs and the miss counts MCNTs according to an example embodiment of the inventive concepts.

Referring to FIG. 12, the count buffer block 620 may divide the hit count HCNT received from the cache monitoring block 640 into the first hit count HCNT_1 and the second hit count HCNT_2 and store results, and divide the miss count MCNT into the first miss count MCNT_1 and the second miss count MCNT_2 and store results. The hit count HCNT and the miss count MCNT counted during the first monitoring period TP_1 may be stored in the first count buffer CNT BUFFER_1 as the first hit count HCNT_1 and the first miss count MCNT_1. The hit count HCNT and the miss count MCNT counted during the second monitoring period TP_2 may be stored in the second count buffer CNT BUFFER_2 as the second hit count HCNT_2 and the second miss count MCNT_2. In order to store the hit count HCNT and the miss count MCNT counted during the third monitoring period TP_3, the first count buffer CNT BUFFER_1 may delete the first hit count HCNT_1 and the first miss count MCNT_1 previously stored therein. Next, the hit count HCNT and the miss count MCNT that have been newly counted may be stored in the first count buffer CNT BUFFER_1 as the first hit count HCNT_1 and the first miss count MCNT_1. Thereafter, data may be stored in a recursive manner.

Referring to FIGS. 8 and 12, the cache monitoring block 640 may access the count buffer block 620 with respect to each monitoring period T_p and read the first hit count HCNT_1, the first miss count MCNT_1, the second hit count HCNT_2 and the second miss count MCNT_2. The cache monitoring block 640 may calculate the cache hit rate HRATE based on the read values.

$$HRATE = \frac{HCNT_1 + HCNT_2}{HCNT_1 + HCNT_2 + MCNT_1 + MCNT_2} \quad \text{[Formula 1]}$$

Referring to Formula 1, the cache hit rate HRATE may be a value obtained by dividing a sum of the first hit count HCNT_1 and the first hit count HCNT_2 by a sum of the first hit count HCNT_1, the second hit count HCNT_2, the first miss count MCNT_1, and the second miss count MCNT_2. In other words, the cache hit rate HRATE may represent an average cache hit rate for a period of time twice as large as the monitoring period T_p.

The cache monitoring block 640 may monitor the average cache hit rate per monitoring period T_p as shown in FIG. 12, however, manners in which the cache monitoring block 640 monitors the cache hit rate HRATE may not be limited thereto. In another example, the cache monitoring block 640 may generate the power control signal P_CTL by taking into account the average cache hit rate for the twice monitoring period T_p and the cache hit rate HRATE for one monitoring period T_p.

Figure 13:
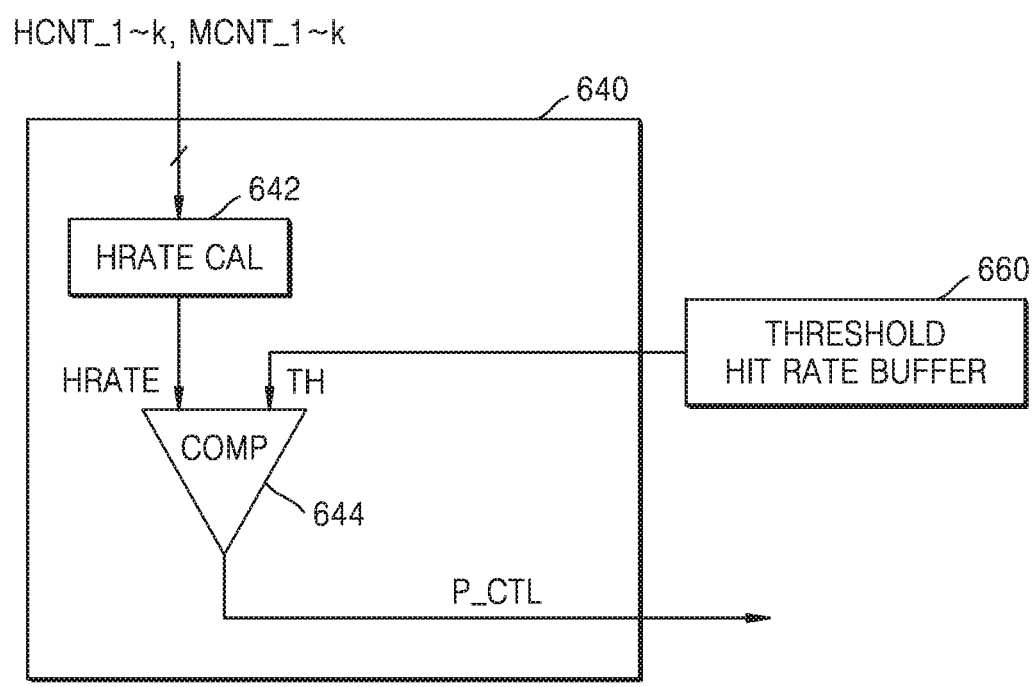
FIG. 13 shows an example block diagram of a cache monitoring block according to an example embodiment of the inventive concepts.

FIG. 13 shows an example block diagram of the cache monitoring block 640 according to an example embodiment of the inventive concepts. The cache monitoring block 640 may include a cache hit rate calculation unit HRATE CAL 642 and a comparison unit 644.

The cache hit rate calculation unit HRATE CAL 642 may calculate the cache hit rate HRATE by reading the hit count HCNT and the miss count MCNT stored in the count buffer block 620 with respect to each monitoring period T_p. The cache hit rate calculation unit HRATE CAL 642 may transmit the calculated cache hit rate HRATE to the comparison unit 644 each monitoring period T_p. The comparison unit 644 may compare the cache hit rate HRATE received from the cache hit rate calculation unit HRATE CAL 642 with the threshold hit rate TH received from the threshold hit rate buffer 660, and generate the power control signal P_CTL.

Referring to FIGS. 2 and 13, when the cache hit rate HRATE is large and the AP 10 exits the idle state, the performance of the AP 10 may be degraded depending on the cache refill REFILL of the second cache 400. Thus, in order to prevent or mitigate performance degradation of the AP 10 when the cache hit rate HRATE is large, the PMU 800 may instruct the AP 10 not to enter the low level idle state. To this end, the power control signal P_CTL may be a flag signal indicating whether the PMU 800 does not determine the power state level as the high-side idle level when the cache hit rate HRATE is greater than the threshold hit rate TH. The cache monitoring block 640 may generate the power control signal P_CTL such that the PMU 800 does not determine the power state level as the high-side idle level. The high-side idle level may include the CPD level or a level lower than the CPD level at which the second cache 400 is turned off.

On the other hand, referring to FIGS. 2 and 13, when the cache hit rate HRATE is small, the performance degradation of the AP 10 due to the cache refill REFILL of the second cache 400 may not be significant even when the AP 10 exits the idle state. Accordingly, in order to reduce power consumption of the AP 10 when the cache hit rate HRATE is small, the PMU 800 may instruct the AP 10 to enter the low level idle state. To this end, the power control signal P_CTL may be the flag signal indicating whether the PMU 800 determines the power state level as the low-side idle level when the cache hit rate HRATE is less than the threshold hit rate TH. The cache monitoring block 640 may generate the power control signal P_CTL such that the PMU 800 can determine the power state level as the low-side idle level.

Referring to FIG. 13, a process of generating the power control signal P_CTL according to a comparison result of the cache hit rate HRATE and the threshold hit rate TH calculated by the cache monitoring block 640 will be described. For convenience of explanation, a fact that the power control signal P_CTL has a first logic level may indicate a state in which the PMU 800 controls the power state level to be unable to determine the power state level as the high-side idle level. A fact that the control signal P_CTL has a second logic level may indicate a state in which the PMU 800 controls the power state level to determine the power state level as the high-side idle level. The first logic level may represent a value of '0' and the second logic level may represent a value of '1', but the example embodiments are not limited thereto.

When the calculated cache hit rate HRATE is greater than the threshold hit rate TH, the PMU 800 may not put the power state level into a low level. For example, the power control signal P_CTL may be generated as the first logic level '0' so that the PMU 800 does not determine the power state level as the high-side idle level.

When the calculated cache hit rate HRATE is less than the threshold hit rate TH, the PMU 800 may put the power state level into the lower level. For example, the power control signal P_CTL may be generated as the second logic level '1' so that the PMU 800 determines the power state level as the high-side idle level.

Figure 14:
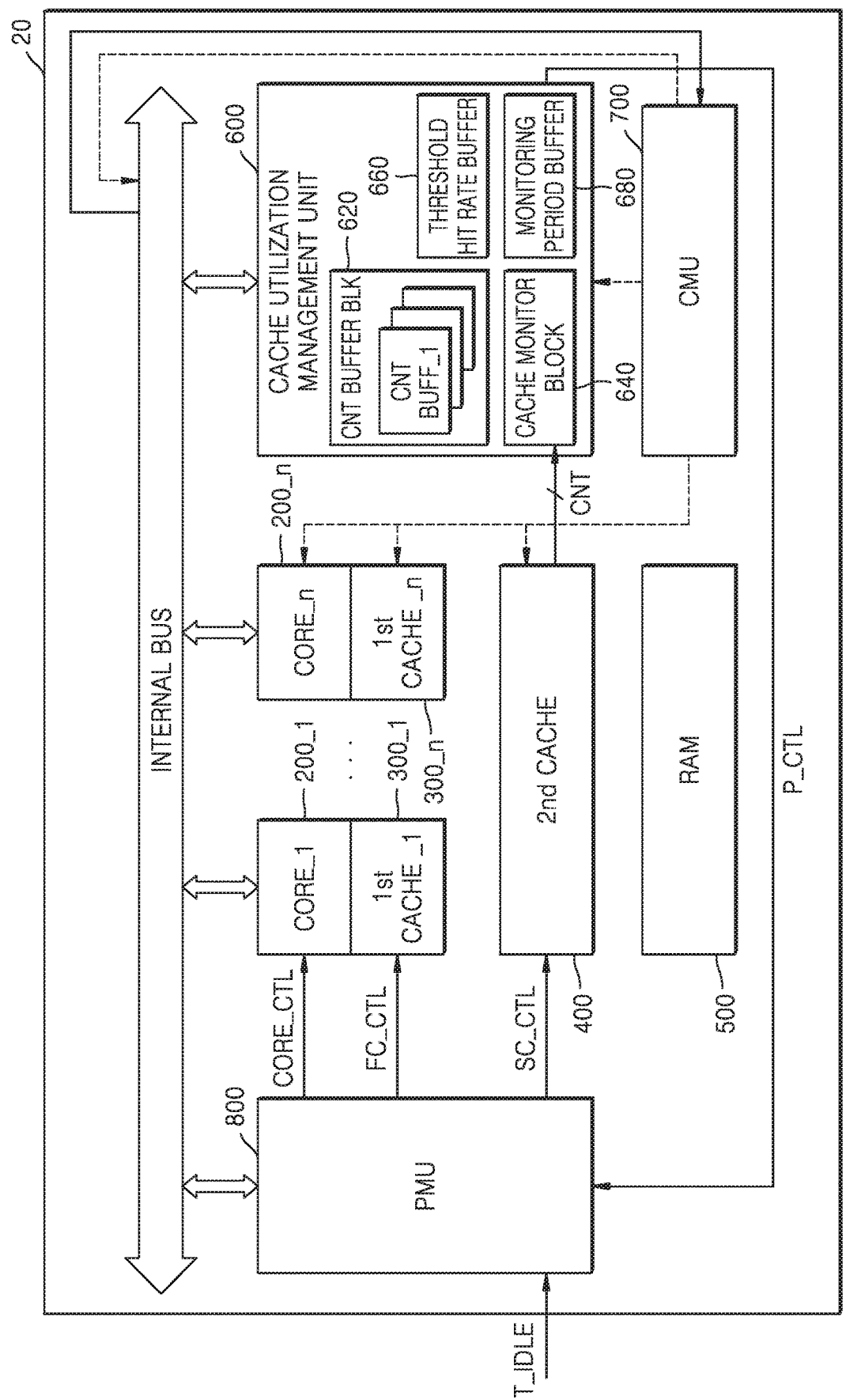
FIG. 14 shows an application processor according to an example embodiment of the inventive concepts.

FIG. 14 shows an AP 20 according to an example embodiment of the inventive concepts. The AP 20 may include at least one of the cores 200_1 through 200_n (n is a natural number of 1 or more), at least one of the first caches 300_1 through 300_n, the second cache 400, a RAM memory 500, the cache utilization management unit 600, a clock management unit (CMU) 700, and the PMU 800. The cores 200_1 through 200_n, the first caches 300_1 through 300_n, the second cache 400, the cache utilization management unit 600, the CMU 700 and the PMU 800 may be connected to an internal bus and exchange various data each other. A description of the at least one of cores 200_1 through 200_n of the AP 10, at least one of the first caches 300_1 to 300_n, the second cache 400, the cache utilization management unit 600 and the PMU 800 may be understood to be the same as explained with reference to FIG. 1.

The RAM memory 500 may be a memory is configured to read information therefrom and write (e.g., store) information thereto. The RAM memory 500 may be used for temporary reading of a main memory device and an application program, and for temporary storing data, or the like. The RAM memory 500 may include one of DRAM, SRAM, a fast page mode RAM (FPM), a window RAM (WRAM), an Extended Data Out (EDO) RAM, a multibank DRAM (MDRAM), a synchronous graphics RAM (SGRAM), a synchronous dynamic RAM (SDRAM), a direct rambus DRAM (DRDRAM), a double data rate RAM (DDR RAM), and a pseudostatic RAM (PSRAM).

The CMU 700 may transmit a clock signal for operation of various components inside the AP 20 to, as shown in dotted lines, at least one of the cores 200_1 through 200_*n*, at least one of the first caches 300_1 to 300_*n*, the second cache 400, the cache utilization management unit 600, or the like. The CMU 700 may be controlled by the PMU 800. The PMU 800 may determine the power state level of the AP 20 based on the expected idle time T_IDLE and the power control signal P_CTL, and control the CMU 700 based on the determined power state level. The PMU 800 may control the CMU 700 to stop the clock or reduce a clock speed in the idle state of the AP 20. Referring to FIG. 5, the PMU 800 may control the CMU 700 to stop the clock in a state in which the state of the AP 20 corresponds to the C1 level or an idle level higher than the C1 level.

Figure 15:
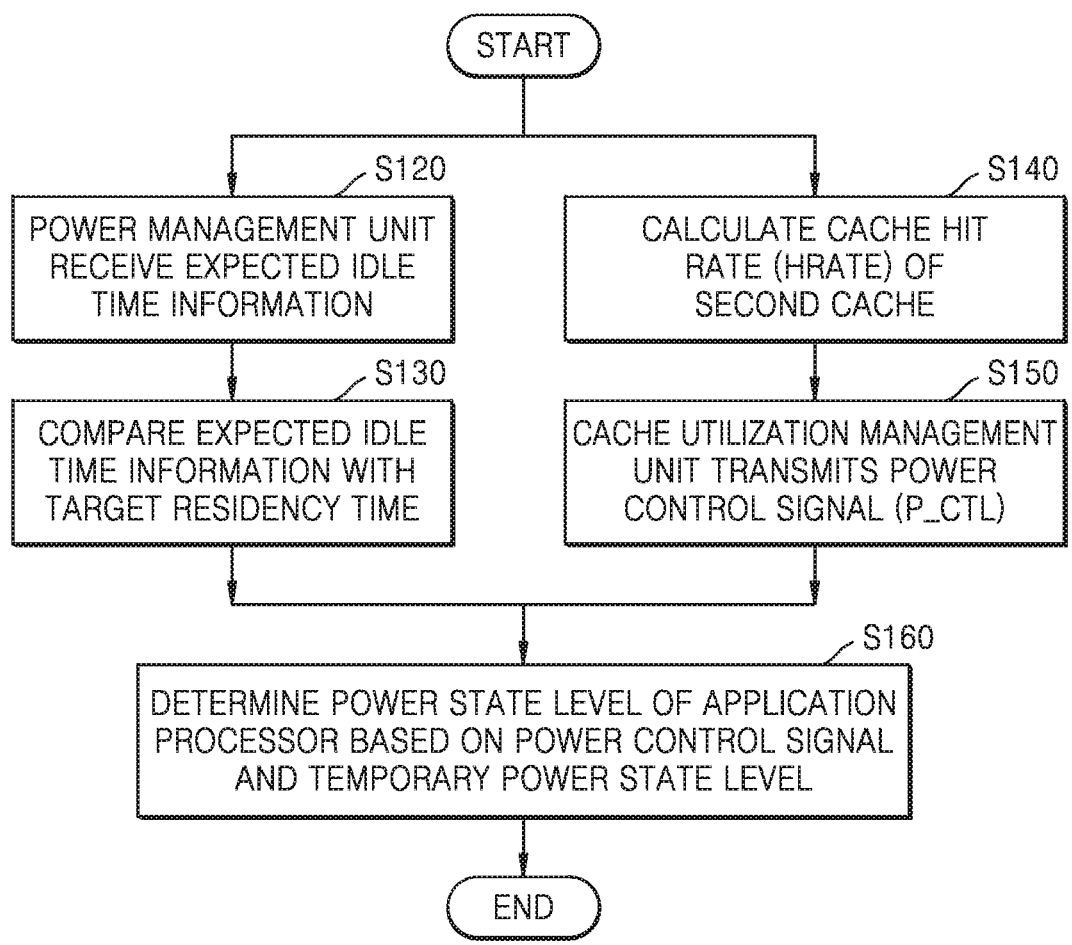
FIG. 15 shows a method of entering a low power mode of an application processor, according to an example embodiment of the inventive concepts.

FIG. 15 shows a method of entering the low power mode of the AP 10, according to an example embodiment of the inventive concepts.

The method of entering the low power mode may include receiving information on the predicted idle time T_IDLE from the outside of the AP 10 (S120), and determining the temporary power state level by comparing the expected idle time T_IDLE with the target residency time (S130). As described above with reference to FIGS. 7A and 7B, when the expected idle time T_IDLE is less than the target residency time, there may be little merit to enter the idle state, and thus the PMU 800 may determine the temporary power state level by comparing the expected idle time T_IDLE with the target residency time.

The method of entering the low power mode may include the cache utilization management unit 600 calculating the cache hit rate HRATE of the second cache 400 of the AP 10 (S140), and the cache utilization management unit 600 comparing the cache hit rate HRATE with the threshold hit rate TH to generate and transmit the power control signal P_CTL to the PMU 800 (S150). As described above with reference to FIG. 1, when the cache hit rate HRATE is greater than the threshold hit rate TH, the cache utilization management unit 600 may transmit the power control signal P_CTL so that the power state level of the AP 10 is not determined as the high-side idle level. The receiving the expected idle time T_IDLE (S120) and the determining the temporary power state level (S130) may simultaneously occur with the determining the cache hit rate HRATE (S140) and the generating and transmitting the power control signal to the PMU 800. In some example embodiments, these processes may occur on a step-by-step basis. Thus, a temporal sequence is not important with respect to the range of operations in the inventive concepts.

The low power mode entry method may include the PMU 800 determining the power state level of the AP 10 based on the power control signal P_CTL and the temporary power state level (S160). The determining the temporary power state level may be described with reference to FIG. 16 and the determining the final power state level may be described with reference to FIG. 17.

Figure 16:
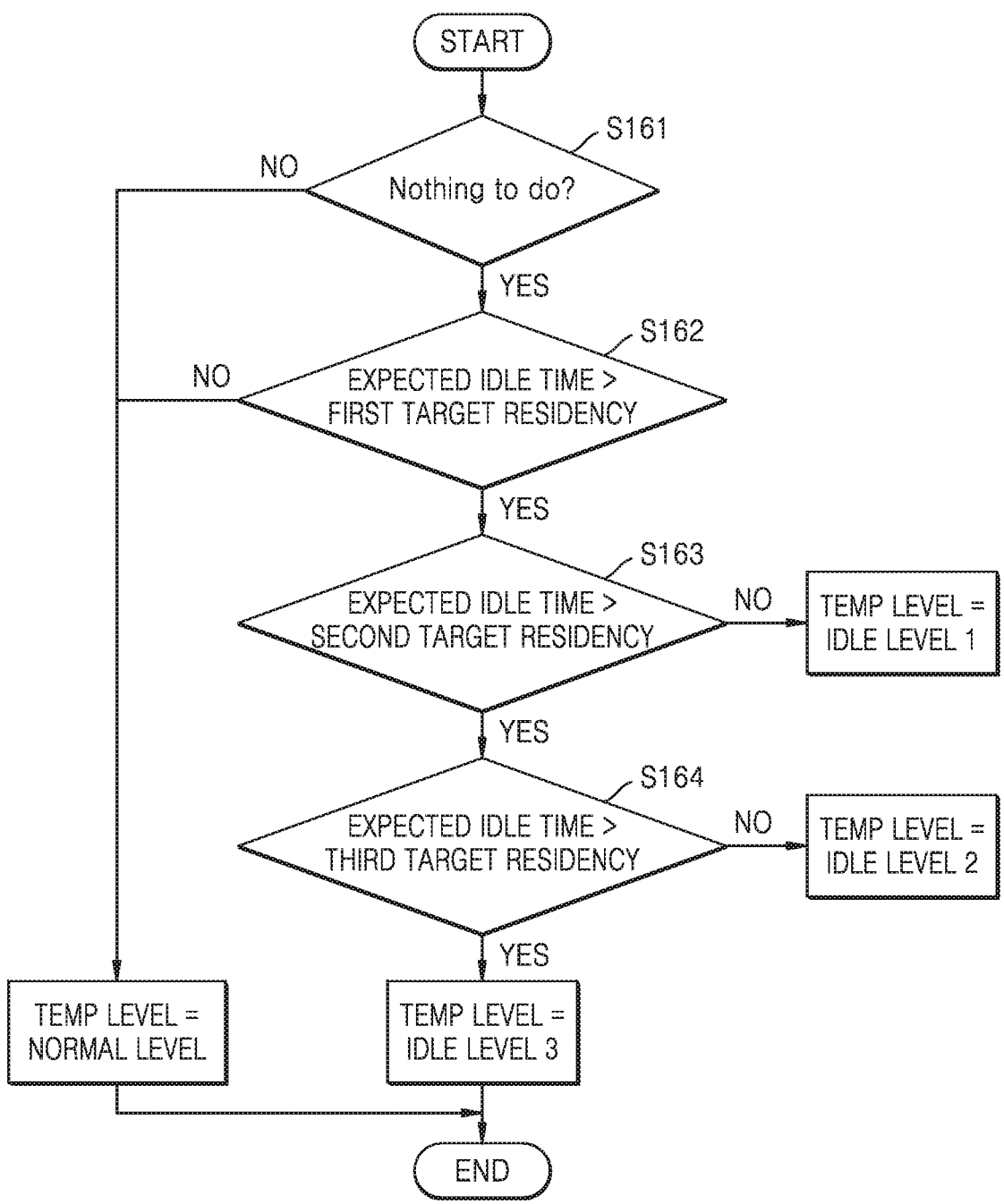
FIG. 16 shows a flowchart in which a power management unit determines a temporary power state level, according to an example embodiment of the inventive concepts.

FIG. 16 shows a flowchart in which the PMU 800 determines the temporary power state level TEMP LEVEL according to an example embodiment of the inventive concepts. Prior to considering a time comparison result, a step of determining whether there is a load to be processed by the AP 10 may be performed (S161). When there is a load to be processed by the AP 10, the PMU 800 may determine the temporary power state level TEMP LEVEL as the normal level NORMAL LEVEL. Descriptions of the normal level, the first idle level, the second idle level, and the third idle level may be the same as those provided above with reference to FIG. 4.

When there is no load to be handled by the AP 10, steps for comparing the expected idle time T_IDLE with the target residency time may be performed (S162, S163, and/or S164). The target residency time may denote a time desired to enter and exit the idle state and may have different values depending on the idle level of the idle state to enter. Because entry to a deeper idle level (or a lower idle level) increases the number of turn-off configurations, the time desired for entry and exit may increase the target residency time. The time desired for entering and leaving the first idle level IDLE LEVEL 1 may be referred to as a first target residency time, the time desired for entering and leaving the second idle level IDLE LEVEL 2 may be referred to as a second target residency time, and the time desired for entry and exit at the third idle level IDLE LEVEL 3 may be the third target residency time. Then, the third target residency time may be the largest and the first target residency time may be the smallest. Here, the time comparison result may include results of comparing the expected idle time T_IDLE with the first target residency time, the second target residency time, and the third target residency time, respectively.

The PMU 800 may first compare the expected idle time T_IDLE with the first target residency time to determine whether to put the AP 10 into the first idle level IDLE LEVEL 1 (S162). When the expected idle time T_IDLE is less than the first target residency time, the temporary power state level TEMP LEVEL may be determined as the normal level NORMAL LEVEL because entering the first idle level IDLE LEVEL 1 may not be beneficial to manage power of the AP 10. On the other hand, when the expected idle time T_IDLE is greater than the first target residency time, the PMU 800 may proceed to a step of determining whether to enter the idle level IDLE LEVEL 2 that is one level lower (e.g., deeper) than the first idle level IDLE LEVEL 1 (S163).

In operation S163, the PMU 800 may compare the expected idle time T_IDLE with the second target residency time to determine whether to put the AP 10 into the second idle level IDLE LEVEL 2. When the expected idle time T_IDLE is less than the second target residency time, the temporary power state level TEMP LEVEL may be determined as the first idle level IDLE LEVEL 1 because entering the second idle level IDLE LEVEL 2 may not be beneficial to manage power of the AP 10. On the other hand, when the expected idle time T_IDLE is greater than the second target residency time, the PMU 800 may proceed to a step of determining whether to enter the third idle level IDLE LEVEL 3 that is one level lower than the second idle level IDLE LEVEL 2 (S164) because entering the second idle level IDLE LEVEL 2 may be beneficial to manage power of the AP 10.

When the expected idle time T_IDLE is greater than the second target residency time, the PMU 800 may first compare the expected idle time T_IDLE with the third target residency time to determine whether to put the AP 10 into the third idle level 3 (S164). When the expected idle time T_IDLE is less than the third target residency time, the temporary power state level TEMP LEVEL may be determined as the second idle level IDLE LEVEL 2 because entering the third idle level 3 may not be beneficial to manage power of the AP. On the other hand, when the expected idle time T_IDLE is greater than the third target residency time, the temporary power state level TEMP LEVEL may be set as the third idle level IDLE LEVEL 3 because entering the third idle level 3 may be beneficial to manage power of the AP.

Figure 17:
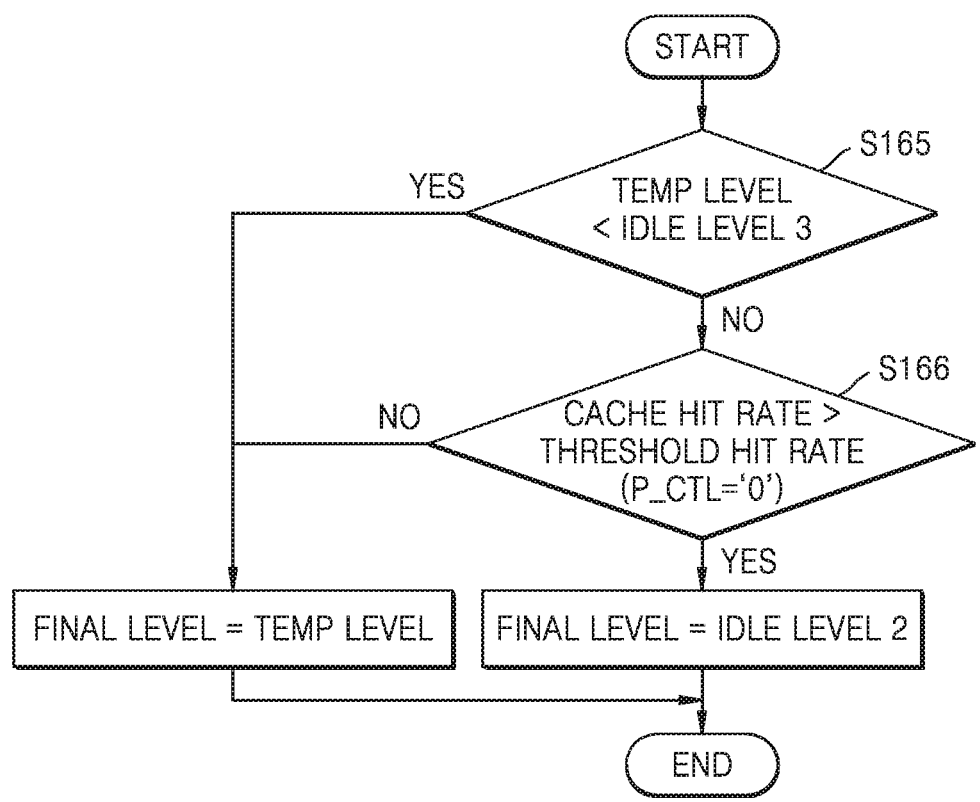
FIG. 17 shows a flowchart in which a final power state level is determined based on a temporary power state level and a power control signal, according to an example embodiment of the inventive concepts.

FIG. 17 shows a flowchart in which the final power state level is determined based on the temporary power state level TEMP LEVEL and the power control signal P_CTL, according to an example embodiment of the inventive concepts. The power control signal P_CTL may be a flag signal that determines whether to put the power state level into the high-side idle level. The lowest idle level among the high-side idle levels may be the third idle level IDLE LEVEL 3 or the CPD level. FIG. 17 can be described with respect to an example embodiment in which the power control signal P_CTL is a flag signal that determines whether to raise the power state level to or above the third idle level IDLE LEVEL 3.

Referring to FIG. 17, the power control signal P_CTL may be a flag signal that determines whether to raise the power state level to or above the third idle level IDLE LEVEL 3. Thus, when the temporary power state level TEMP LEVEL determined based on the expected idle time T_IDLE is lower than the third idle level 3 IDLE LEVEL 3 (or a level shallower that the third idle level 3 IDLE LEVEL 3), the PMU 800 may determine the power state level FINAL LEVEL as the temporary power state level TEMP LEVEL without considering the power control signal P_CTL (S165). On the other hand, when the temporary power state level TEMP LEVEL is equal to or higher than the third idle level 3, a next step may be performed in which the PMU 800 determines whether to enter the third idle level or an idle level higher (e.g., deeper) than the third idle level based on the power control signal P_CTL (S166).

When the temporary power state level TEMP LEVEL is equal to or higher than the third idle level IDLE LEVEL 3, the PMU 800 may proceed to a step of comparing the cache hit rate HRATE with the threshold hit rate TH to determine the final power state level FINAL LEVEL (S166). The final power state level FINAL LEVEL may be determined as the temporary power state level TEMP LEVEL or the second idle level IDLE LEVEL 2 (e.g., the highest level among the low-side idle levels IDLE LEVEL 2 and IDLE LEVEL 3) based on comparison results between the cache hit rate HRATE and the threshold hit rate TH.

When the cache hit rate HRATE is less than the threshold hit rate TH, the final power state level FINAL LEVEL may be determined to be equal to or lower (e.g., shallower) than the third idle level because the performance degradation due to cache refill REFILL after exiting the idle state may not be significant. In other words, the power state level may be determined as the temporary power state level TEMP LEVEL.

On the other hand, when the cache hit rate HRATE is larger than the threshold hit rate TH, the time desired for the cache refill REFILL after exiting the idle state may not be negligible. Thus, the final power state level FINAL LEVEL may not be allowed to be equal to or higher (e.g., deeper) than the third idle level IDLE LEVEL 3, considering the performance of the AP 10 after exiting the idle state. Thus, in this case, the final power state level may be determined as the second idle level IDLE LEVEL 2, even when the temporary power state level TEMP LEVEL is equal to or higher than the third idle level IDLE LEVEL 3.

Figure 18:
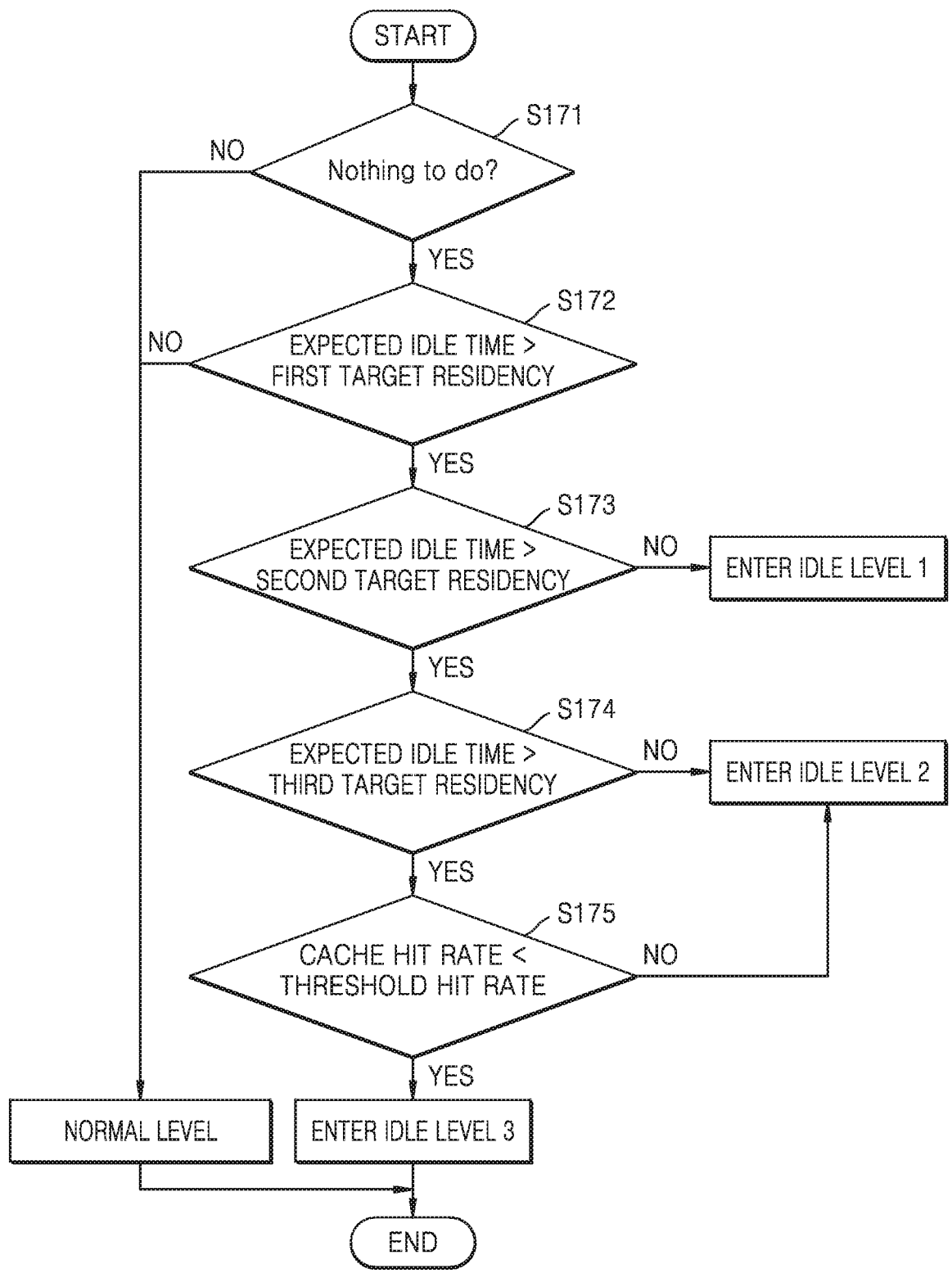
FIG. 18 shows an overall flowchart of determining a power state level, according to an example embodiment of the inventive concepts.

FIG. 18 shows an overall flowchart for determining the power state level according to an example embodiment of the inventive concepts. Referring to FIGS. 16 and 17, the PMU 800 may determine the temporary power state level TEMP LEVEL by comparing the expected idle time T_IDLE with the target residency time, and determine the power state level based on the power control signal P_CTL, which is a result of comparing the cache hit rate HRATE with the threshold hit rate TH, and the temporary power state level TEMP LEVEL. The temporary power state level TEMP LEVEL may be a concept introduced for convenience of explanation. According to some example embodiments, the temporary power state level TEMP LEVEL at intermediate steps may not be determined, and thus the final power state level FINAL LEVEL may be determined according to the flowchart referred in FIG. 18, without separately determining a temporary power state level TEMP LEVEL.

In other words, referring to FIG. 18, the power state level may be determined in the same manner as described with reference to FIGS. 16 and 17, but the intermediate power state level may not be determined. A method of determining the final power state level FINAL LEVEL by comparing the expected idle time T_IDLE with the target residency time of each idle level and comparing the cache hit rate HRATE with the threshold hit rate TH may be understood to be the same as or substantially similar to the method described with reference to FIGS. 16 and 17.

Figure 19:
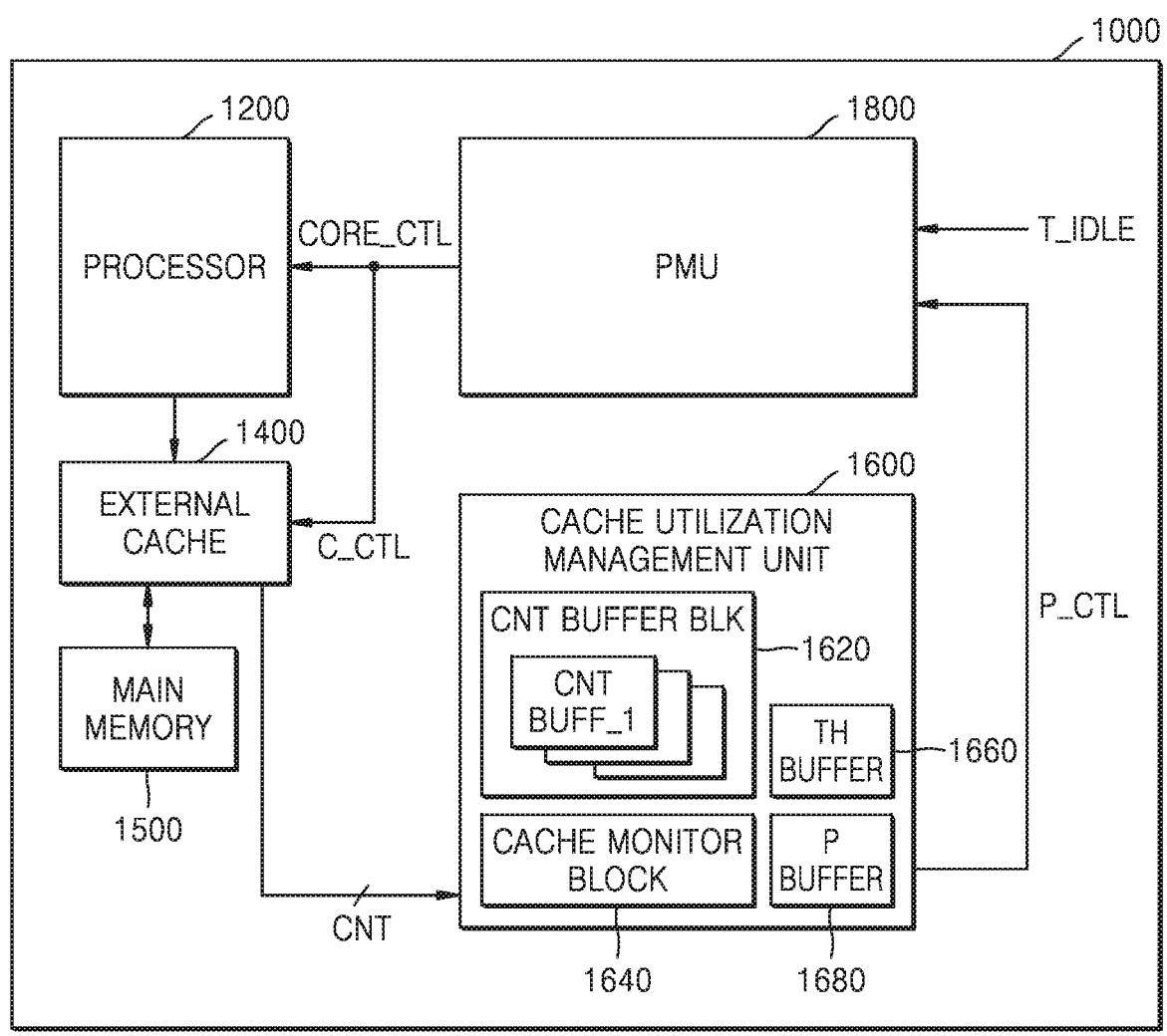
FIG. 19 shows a computing device according to an example embodiment of the inventive concepts.

FIG. 19 illustrates a computing device 1000 in accordance with an example embodiment of the inventive concepts. The computing device 1000 may be implemented by an electrical device such as a computer, a smart phone, a tablet computer, PDA, and a digital camera.

The computing device 1000 may include a processor 1200, an external cache memory 1400, a main memory 1500, a cache utilization management unit 1600, and a PMU 1800. The processor 1200 may compute and process data and commands of the electronic device implemented into the computing device 1000 and may be a central processing unit (CPU) in a computer. The external cache memory 1400 may be a memory for solving a speed difference problem between the processor 1200 and the main memory 1500, and may be arranged outside the processor 1200. The external cache memory 1400 may be a large-capacity cache memory and may include at least one of an L2 cache (a Level 2 Cache) and an L3 cache (a Level 3 Cache).

The main memory 1500 may store commands and data to be executed by the process 1200. The main memory 1500 may be implemented by a volatile memory device or a non-volatile memory device. The volatile memory device may be implemented by DRAM, SRAM, a thyristor RAM (T-RAM), a zero capacitor RAM (Z-RAM), or a twin transistor RAM (TTRAM). The nonvolatile memory device may be implemented by an electrically erasable programmable read-only memory (EEPROM), a flash memory, MRAM, a spin transfer torque MRAM, a conductive bridging RAM (CBRAM), FeRAM, PRAM, RRAM, a nanotube RRAM, a polymer RAM (PoRAM), or an insulator resistance change memory.

The cache utilization management unit 1600 may calculate the cache hit rate by reading the hit count HCNT and the miss count MCNT of the external cache memory 1400, and may generate the power control signal P_CTL for power management of the computing device 1000 based on the cache hit rate and transmit the power control signal P_CTL to the PMU 1800. The cache utilization management unit 1600 may include a count buffer block 1620, a cache monitoring block 1640, a threshold hit rate buffer 1660, and a monitoring period buffer 1680. The count buffer block 1620 may include at least one count buffer. The power control signal P_CTL may be a flag signal indicating whether the computing device 1000 is determined to enter the high-side idle level. A method of generating the power control signal P_CTL by the cache utilization management unit 1600 based on the hit count HCNT and the miss count MCNT of the external cache memory 1400 may be understood to be the same as that described above with reference to FIGS. 8, 9, 10, 11A, 11B, 12, and 13.

The PMU 1800 may determine the power state level of the computing device 1000 based on the expected idle time T_IDLE and the power control signal P_CTL and may determine the power state level of the computing device 1000 based on the power state level. The control method of the PMU 1800 may be understood to be the same as that described above with reference to FIGS. 4, 5, 6, 7A, 7B, and 10.

Figure 20:
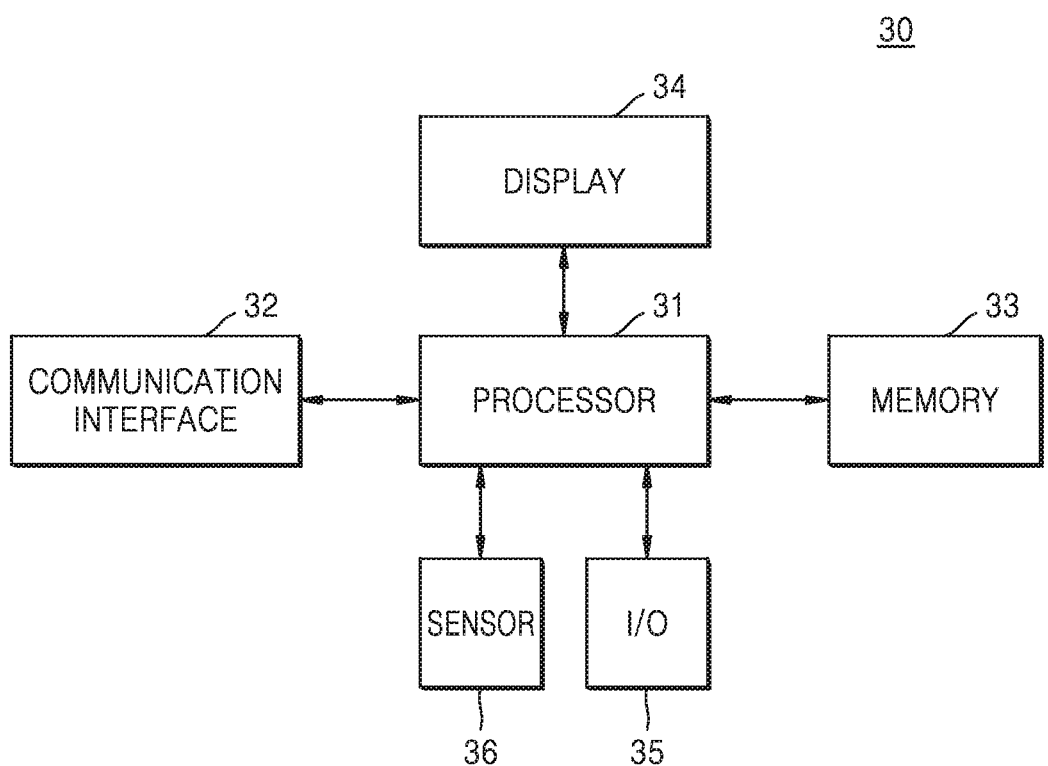
FIG. 20 shows a hardware architecture diagram of an Internet of Things (IoT) device according to an example embodiment of the inventive concepts.

FIG. 20 is a hardware architecture diagram of an Internet of Things (IoT) device 30 according to an example embodiment of the inventive concepts. The IoT may refer to a network of objects using wired/wireless communication between them. The IoT device 30 may include an active IoT device that operates using its own power and a passive IoT device that operates using externally applied power. The active IoT devices may include refrigerators, air conditioners, telephones, automobiles, etc., and the passive IoT devices may include Radio Frequency Identification (RFID) tags or near field communication (NFC) tags.

The IoT device 30 may include a processor 31 or an AP 31, a communication interface 32, a memory 33, a display 34, an input/output interface 35, and a sensor 36.

The communication interface 32 may be an interface for the IOT device 30 to communicate with the outside, and may be a wireless local communication interface such as a local area network (LAN), a Bluetooth, and a wireless LAN (WLAN) and a modem communication interface connectable to mobile communication network such as a power line communication (PLC), a third generation (3G), or a long term evolution (LTE).

The memory 33 may store a control command code for controlling the IoT device 30, control data, or user data. The memory 33 may include at least one of the volatile memory and the nonvolatile memory. The non-volatile memory may be a ROM (Read Only Memory), a programmable ROM (PROM), an electrically PROM (EPROM), an electrically EPROM (EEPROM), the flash memory, and the like. The volatile memory may include at least one of various memories such as DRAM, SRAM, SDRAM, PRAM, MRAM, RRAM, and FeRAM.

The display 34 may display internal state information of the IoT device 30 and may include a touch sensor (not shown).

The sensor 36 may include at least one sensor for collecting nearby information, and may sense at least one of an ambient temperature, illuminance, an ultraviolet ray index, a velocity, and image information.

As the use of sensors 36 increases in mobile IoT devices such as wearable devices, smart phones, mobile medical devices, mobile security devices, and vehicles, a low power consumption of IoT devices 30 may be desired. Accordingly, the processor 31 of the IoT device 30 may include the AP 20 including the cache utilization management unit 600 described with reference to FIG. 14. The cache utilization management unit 600 may monitor the cache memory of the AP 20 to determine the power state level of the AP 20 and the processor 31 of the IoT device 30 may enter the low power mode without any performance degradation and thus, an operation reliability of the IoT device 30 may be enhanced.

Further, the IoT device 30 may further include the processor 31, a cache utilization management unit and a PMU, as described with reference to FIG. 19. Because the cache utilization management unit can determine the power status level of the IoT device 30 by monitoring a utilization amount of the external cache memory, the IoT device 30 can enter the low power mode without any performance degradation, an operation reliability of the IoT device 30 may be enhanced.

While example embodiments of the inventive concepts have been particularly shown and described with reference to some example embodiments thereof, it will be understood by those of ordinary skill in the art that various changes in form and details may be made therein without departing from the spirit and scope of the inventive concepts as defined by the following claims.

What is claimed is:

1. An application processor comprising:
   at least one core;
   at least one first cache respectively connected to the at least one core, the at least one first cache associated with an operation of the at least one core;
   a second cache associated with an operation of the at least one core, the second cache having a storage capacity greater than the at least one first cache;
   a cache utilization management circuit configured to generate a power control signal for power management of the application processor based on a cache hit rate of the second cache; and
   a power management circuit configured to determine a power state level of the application processor based on the power control signal and an expected idle time, the power management circuit configured to control the at least one core, the at least one first cache, and the second cache based on the power state level,
   wherein the cache utilization management circuit is further configured to generate the power control signal in response to the cache hit rate of the second cache being greater than a threshold hit rate such that the application processor does not enter a power mode deeper than a particular power mode.

2. The application processor of claim 1, wherein the power state level is one of a normal level indicating a first state in which the application processor has not entered a low power mode or a plurality of idle levels indicating a second state in which the application processor has entered the lower power mode.

3. The application processor of claim 2, wherein the plurality of idle levels comprise a high-side idle level, in which the second cache is turned off, and a low-side idle level, in which the second cache is not turned off.

4. The application processor of claim 3, wherein the low-side idle level includes a first idle level and a second idle level, and the high-side idle level includes a third idle level, the first idle level is a level configured to turn off a clock signal of the application processor, the second idle level is a level configured to turn off the clock signal, the at least one core, and the at least one first cache of the application processor, and the third idle level is a level configured to turn off the clock signal, the at least one core, the at least one first cache, and the second cache of the application processor.

5. The application processor of claim 3, wherein, when the cache hit rate is greater than the threshold hit rate, the power management circuit is configured to not determine the power state level as the high-side idle level.

6. The application processor of claim 1, wherein the cache utilization management circuit comprises:
a count buffer configured to store a hit count and a miss count of the second cache; and
a cache monitor configured to calculate the cache hit rate and generate the power control signal.

7. The application processor of claim 6, wherein the cache monitor is configured to,
count the hit count and the miss count of the second cache for each of at least one monitoring period,
store the hit count and the miss count in the count buffer, and
calculate the cache hit rate based on the hit count and the miss count stored in the count buffer for each of the at least one monitoring period.

8. The application processor of claim 6, wherein the count buffer is configured to,
store the hit count as a first hit count or a second hit count in an alternating manner for each of at least one monitoring period, and
store the miss count as a first miss count or a second miss count in an alternating manner for each of at least one monitoring period.

9. The application processor of claim 8, wherein the count buffer comprises:
a first count buffer configured to store the first hit count and the first miss count; and
a second count buffer configured to store the second hit count and the second miss count.

10. The application processor of claim 8, wherein the cache hit rate is a value obtained by dividing a first sum of the first hit count and the second hit count by a second sum of the first hit count, the second hit count, the first miss count, and the second miss count.

11. The application processor of claim 6, wherein the cache utilization management circuit further comprises:
a threshold hit rate buffer configured to store the threshold hit rate; and
a monitoring period buffer configured to store a value of a monitoring period.

12. The application processor of claim 1, wherein the at least one first cache comprises an L1 cache, and the second cache comprises at least one of an L2 cache or an L3 cache.

13. A method of entering a low power mode of an application processor the method comprising:
receiving, by the application processor, an expected idle time from a source external to the application processor;
comparing, by the application processor, the expected idle time with at least one target residency time to determine a temporary power state level;
calculating, by the application processor, a cache hit rate of a first cache of the application processor;
generating, by the application processor, a power control signal based on the cache hit rate; and
determining, by the application processor, a power state level of the application processor based on the power control signal and the temporary power state level,
wherein the generating the power control signal comprises generating the power control signal in response to the cache hit rate of the first cache being greater than a threshold hit rate such that the application processor does not enter a power mode deeper than a particular power mode.

14. The method of claim 13, wherein the determining a power state level comprises:
determining, by the application processor, the power state level as one of a normal level indicating a first state in which the application processor has not entered the low power mode or a plurality of idle levels indicating a second state in which the application processor has entered the low power mode,
wherein the plurality of idle levels include a high-side idle level to turn off the first cache and a plurality of low-side idle levels configured to not turn off the first cache.

15. The method of claim 14, wherein
the plurality of low-side idle levels include a first idle level and a second idle level, the first idle level configured to turn off a clock of the application processor, the second idle level configured to turn off the clock, a core of the application processor, and a second cache of the application processor, the second cache having a storage capacity smaller than the first cache; and
the high-side idle level comprises a third idle level, the third idle level configured to turn off the clock, the core, the first cache, and the second cache of the application processor.

16. The method of claim 14, wherein the determining a power state level comprises:
determining the power state level as the temporary power state level in response to the temporary power state level corresponding to the low-side idle levels; and
determining the power state level as one of the temporary power state level or one of the low-side idle levels based on the power control signal in response to the temporary power state level corresponding to the high-side idle level.

17. The method of claim 16, wherein the determining a power state level comprises:
determining the power state level as the temporary power state level in response to the cache hit rate being equal to or less than the threshold hit rate; and
determining the power state level to be a highest level among the low-side idle levels in response to the cache hit rate being greater than the threshold hit rate.

18. The method of claim 13, wherein the calculating a cache hit rate comprises:
counting, by the application processor, a hit count and a miss count of the first cache;
storing, by the application processor, the hit count and the miss count; and
calculating, by the application processor, the cache hit rate based on the hit count and the miss count.

19. The method of claim 18, wherein the storing the hit count and the miss count comprises:
storing the hit count as a first hit count or a second hit count in an alternating manner for each of at least one monitoring period; and
store the miss count as a first miss count or a second miss count in an alternating manner for each of at least one monitoring period.

20. A computing device comprising:
at least one external cache memory; and
at least one processor outside the at least one external cache memory, the at least one processor configured to,
generate, based on a cache hit rate of the at least one external cache memory, a power control signal for power management of the computing device,
generate the power control signal in response to the cache hit rate of the at least one external cache memory being greater than a threshold hit rate such that the computing device does not enter a power mode deeper than a particular power mode, determine a power state level of the computing device based on the power control signal, and control the at least one processor and the at least one external cache memory based on the power state level.

* * * * *